(12) United States Patent
Agetsuma et al.

(10) Patent No.: US 11,636,015 B2
(45) Date of Patent: Apr. 25, 2023

(54) STORAGE SYSTEM AND CONTROL SOFTWARE DEPLOYMENT METHOD

(71) Applicant: Hitachi, Ltd., Tokyo (JP)

(72) Inventors: Masakuni Agetsuma, Tokyo (JP); Yuko Matsui, Tokyo (JP); Shintaro Ito, Tokyo (JP); Hideo Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/496,980

(22) Filed: Oct. 8, 2021

(65) Prior Publication Data
US 2022/0027246 A1    Jan. 27, 2022

Related U.S. Application Data

(63) Continuation of application No. 16/827,914, filed on Mar. 24, 2020, now Pat. No. 11,144,415, which is a
(Continued)

(30) Foreign Application Priority Data

Nov. 30, 2017    (JP) ................................ 2017-231220

(51) Int. Cl.
*G06F 11/00*    (2006.01)
*G06F 11/20*    (2006.01)
(Continued)

(52) U.S. Cl.
CPC ............ *G06F 11/2094* (2013.01); *G06F 8/60* (2013.01); *G06F 8/65* (2013.01); *G06F 11/1482* (2013.01);
(Continued)

(58) Field of Classification Search
CPC ............ G06F 11/2094; G06F 11/1482; G06F 11/3006; G06F 11/302; G06F 11/3034;
(Continued)

(56) References Cited

U.S. PATENT DOCUMENTS 6,804,730 B1    10/2004    Kawashima
2003/0126315 A1    7/2003    Tan et al.
(Continued)

FOREIGN PATENT DOCUMENTS

JP    2009-48360 A    3/2009
JP    2011-141675 A    7/2011
(Continued)

OTHER PUBLICATIONS

Japanese Office Action received in corresponding Japanese Application No. 2017-231220 dated Feb. 4, 2020.
(Continued)

*Primary Examiner* — Sarai E Butler
(74) *Attorney, Agent, or Firm* — Mattingly & Malur, PC

(57) ABSTRACT

A storage system includes a plurality of storage nodes. The storage node includes: one or more storage devices which respectively provide a storage area; and one or more control software which read/write requested data from/into the corresponding storage device according to a request from a higher-level device, wherein each of the control software retains predetermined configuration information required for reading/writing requested data from/into the corresponding storage device according to a request from the higher-level device, wherein a plurality of the control software are managed as a redundancy group, and the configuration information retained in each of the control software belonging to the same redundancy group is synchronously updated, and wherein the plurality of control software configuring the redundancy group are each deployed in respectively differ-
(Continued)

ent storage nodes so as to distribute a load of each of the storage nodes.

12 Claims, 17 Drawing Sheets

Related U.S. Application Data continuation of application No. 16/133,798, filed on Sep. 18, 2018, now Pat. No. 10,621,060, which is a continuation of application No. 15/910,063, filed on Mar. 2, 2018, now Pat. No. 10,083,100.

(51) Int. Cl.
*G06F 8/65* (2018.01)
*G06F 11/30* (2006.01)
*G06F 8/60* (2018.01)
*G06F 11/14* (2006.01)
*G06F 11/16* (2006.01)

(52) U.S. Cl.
CPC ........ *G06F 11/302* (2013.01); *G06F 11/3006* (2013.01); *G06F 11/3034* (2013.01); *G06F 11/3051* (2013.01); *G06F 11/3055* (2013.01); *G06F 11/1662* (2013.01); *G06F 11/201* (2013.01); *G06F 2201/805* (2013.01); *G06F 2201/815* (2013.01); *G06F 2201/82* (2013.01); *G06F 2201/865* (2013.01)

(58) Field of Classification Search
CPC ............. G06F 11/3051; G06F 11/3055; G06F 11/1662; G06F 11/201; G06F 2201/84; G06F 2201/82
USPC ...................................... 714/1–57
See application file for complete search history.

(56) References Cited

U.S. PATENT DOCUMENTS

| | | |
|---|---|---|
| 2005/0033804 A1 | 2/2005 | Iwami et al. |
| 2005/0076157 A1 | 4/2005 | Serizawa |
| 2005/0216692 A1 | 9/2005 | Watanabe et al. |
| 2007/0067584 A1* | 3/2007 | Muto .................. G06F 11/2071 714/E11.102 |
| 2007/0168058 A1* | 7/2007 | Kephart .............. G06F 11/2028 714/E11.08 |
| 2007/0283139 A1 | 12/2007 | Kato |
| 2009/0049240 A1 | 2/2009 | Oe et al. |
| 2009/0313617 A1 | 12/2009 | Hung |
| 2011/0191639 A1* | 8/2011 | Shinohara .......... H04L 67/1097 714/E11.054 |
| 2011/0231452 A1* | 9/2011 | Nakajima .......... G06F 11/1469 707/E17.005 |
| 2012/0198447 A1 | 8/2012 | Osogami et al. |
| 2012/0239988 A1 | 9/2012 | Morimoto |
| 2013/0103978 A1* | 4/2013 | Akutsu .................. G06F 3/061 714/6.23 |
| 2015/0055483 A1 | 2/2015 | Lee et al. |
| 2015/0242264 A1* | 8/2015 | Vibhor .................... H04L 67/10 714/57 |
| 2015/0378848 A1* | 12/2015 | Kaneko ............... G06F 11/2094 714/19 |
| 2016/0004615 A1* | 1/2016 | Uehara ................. G06F 3/0689 714/6.22 |
| 2016/0105313 A1 | 4/2016 | Jha |
| 2016/0179641 A1 | 6/2016 | Maeda |
| 2016/0202920 A1 | 7/2016 | Vellimalai |
| 2017/0060710 A1 | 3/2017 | Ramani |

FOREIGN PATENT DOCUMENTS

| | | |
|---|---|---|
| JP | 2012-159928 A | 8/2012 |
| JP | 2014-075027 A | 4/2014 |
| JP | 2015-513333 A | 5/2015 |

OTHER PUBLICATIONS

Japanese Office Action received in corresponding Japanese Application No. 2020-185271 dated Sep. 28, 2021.

* cited by examiner

FIG.4

LOGICAL-PHYSICAL CONVERSION TABLE 27

| LUN | LOGICAL PAGE | PHYSICAL PAGE | | |
|---|---|---|---|---|
| | | NODE ID | DRIVE NUMBER | SECTOR NUMBER |
| 0 | 0 | 0 | 1 | 0x00000000 |
| 0 | 1 | 0 | 3 | 0x00000000 |
| ... | | | | |
| 1 | 0 | 0 | 1 | 0x00010000 |
| 1 | 1 | — | — | — |
| ... | | | | |
| 2 | 0 | 3 | 0 | 0x00000000 |
| 2 | 1 | 4 | 0 | 0x00010000 |
| ... | | | | |

STORAGE NODE MANAGEMENT TABLE 24

| NODE ID | STATUS | CA-PACITY | USED CA-PACITY | CPU LOAD (%) | MEMORY AMOUNT | USED MEMORY AMOUNT | COMMU-NICATION BAND | USED COMMU-NICATION BAND | FAILURE GROUP ID |
|---|---|---|---|---|---|---|---|---|---|
| 1 | NORMAL | 50TB | 10TB | 45% | 128GB | 55GB | 20Gbps | 5Gbps | 1 |
| 2 | ABNORMAL | 50TB | - | - | 128GB | - | 20Gbps | - | 2 |
| 3 | NORMAL | 50TB | 9TB | 80% | 128GB | 100GB | 20Gbps | 6Gbps | 3 |
| 4 | NORMAL | 50TB | 8TB | 40% | 128GB | 50GB | 20Gbps | 5Gbps | 3 |
| 24A | 24B | 24C | 24D | 24E | 24F | 24G | 24H | 24I | 24J |

FIG.6

CONTROL SOFTWARE MANAGEMENT TABLE 25

| CONTROL SOFT-WARE ID | STATUS | GROUP ID | OPERATING NODE ID | USED CAPACITY | CPU LOAD | USED MEMORY AMOUNT | USED COMMU-NICATION BAND | LUN |
|---|---|---|---|---|---|---|---|---|
| 1 | Active | 1 | 1 | 5TB | 40% | 50GB | 3Gbps | 1,2 |
| 2 | Dead | 1 | 2 | - | - | - | - | 1,2 |
| 3 | Dead | 2 | 2 | - | - | - | - | 3,4 |
| 4 | Active | 2 | 3 | 6TB | 40% | 50GB | 3Gbps | 3,4 |
| 5 | Active | 3 | 3 | 3TB | 40% | 50GB | 3Gbps | 5 |
| 6 | Passive | 3 | 4 | 3TB | 5% | 5GB | 3Gbps | 5 |
| 7 | Active | 4 | 4 | 5TB | 35% | 45GB | 2Gbps | 6 |
| 8 | Passive | 4 | 1 | 5TB | 5% | 5GB | 2Gbps | 6 |
| 25A | 25B | 25C | 25D | 25E | 25F | 25G | 25H | 25I |

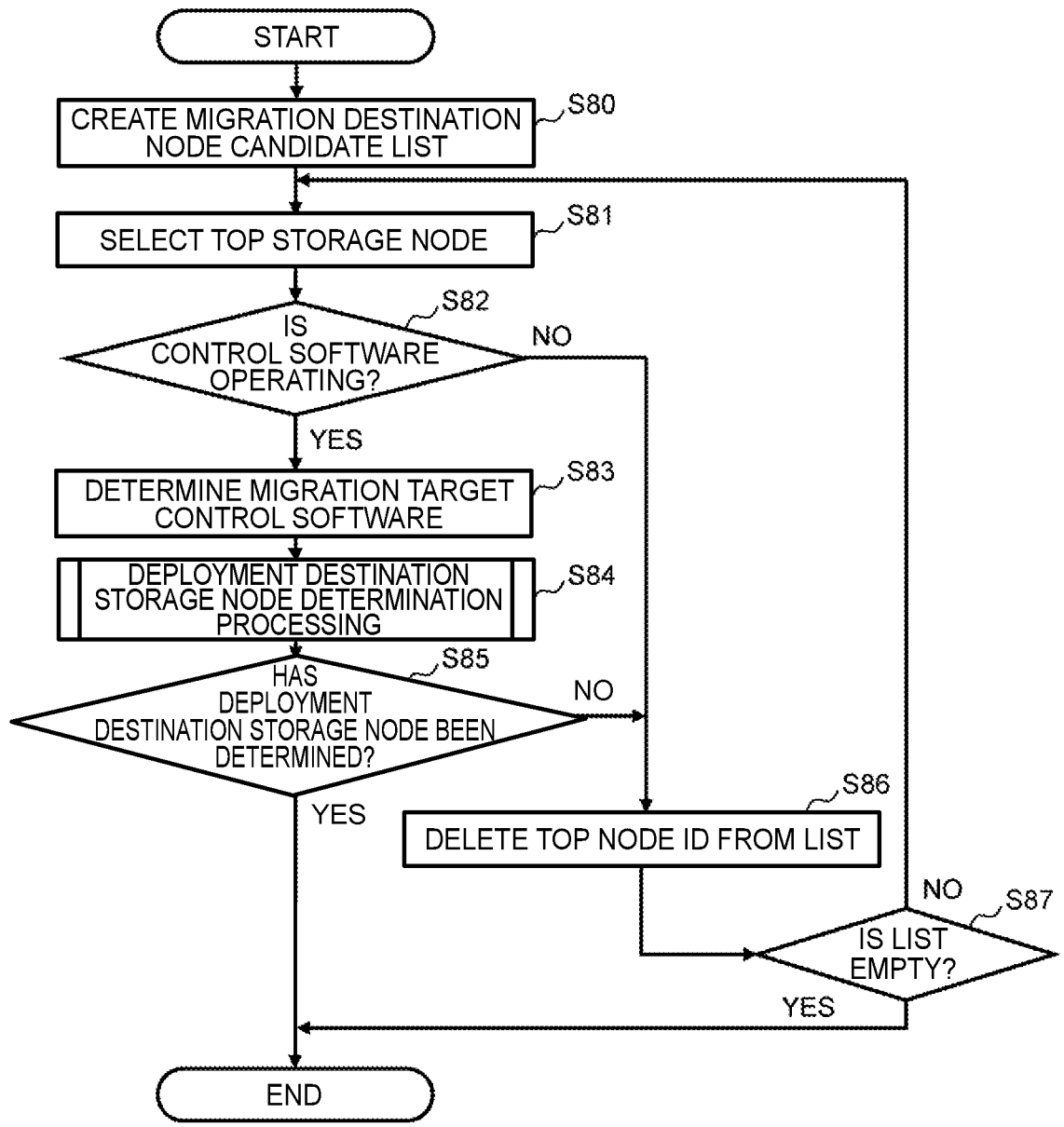

STORAGE SYSTEM AND CONTROL SOFTWARE DEPLOYMENT METHOD

TECHNICAL FIELD

The present invention relates to a storage system and a control software deployment method and, for instance, can be suitably applied to an information processing system comprising a plurality of storage nodes each equipped with one or more SDSs (Software Defined Storages). Note that, in the ensuing explanation, the term "SDS" refers to a storage apparatus that is configured by loading software, which has a storage function, in a general purpose server device.

BACKGROUND ART

Conventionally, with an information processing system, a redundancy configuration of the server device is often adopted for improving availability and reliability. Thus, upon improving the processing performance of the overall system in a conventional information processing system, the scale-out method of adding/reducing physical servers in units of a plurality of server devices configuring the redundancy configuration is being broadly adopted.

Nevertheless, according to this kind of conventional scale-out method, a plurality of physical servers need to be added for redundancy even when adding the server function of only one server, and there was a problem in that costs would increase by that much.

Meanwhile, in recent years, the virtualization technology of running a plurality of virtual machines on a single physical server is become widely prevalent, and numerous inventions have been proposed for the redundancy of virtual machines. For example, PTL 1 discloses a technology of arranging, in a plurality of physical servers, a plurality of virtual machines of active systems and virtual machines of reserve systems each provided in correspondence with the foregoing virtual machines of active systems.

According to this kind of virtualization technology, even in cases of adding a group of active system virtual machines and their reserve system virtual machines (this is hereinafter referred to as the "virtual machine group"), there is an advantage in that it is not necessary to add the same number of physical servers as the number of virtual machines configuring the virtual machine group, and scale-out can be performed efficiently and inexpensively.

CITATION LIST

Patent Literature

PTL 1: Japanese Unexamined Patent Application Publication No. 2014-75027

SUMMARY OF THE INVENTION

Problems to be Solved by the Invention

PTL 1 describes a technology of respectively arranging the active system virtual machines and the reserve system virtual machines in separate physical servers (active system-dedicated physical server or reserve system-dedicated physical server). Here, for instance, by arranging certain active system virtual machines and certain reserve system virtual machines in the same physical server, it may be possible to effectively utilize information processing resources as an overall system.

Thus, proposed is a storage control software deployment method capable of effectively utilizing information processing resources as an overall system while maintaining the availability and reliability required in a storage system.

Means to Solve the Problems

In order to achieve the foregoing object, the present invention provides a storage system including a plurality of storage nodes, wherein the storage node comprises: one or more storage devices which respectively provide a storage area; and one or more control software which read/write requested data from/into the corresponding storage device according to a request from a higher-level device, wherein each of the control software retains predetermined configuration information required for reading/writing requested data from/into the corresponding storage device according to a request from the higher-level device, wherein a plurality of the control software are managed as a redundancy group, and the configuration information retained in each of the control software belonging to the same redundancy group is synchronously updated, and wherein the plurality of control software configuring the redundancy group are each deployed in respectively different storage nodes so as to distribute a load of each of the storage nodes.

Moreover, the present invention additionally provides a control software deployment method of deploying, in a storage system including a plurality of storage nodes each equipped with one or more storage devices, one or more control software which read/write requested data from/into the corresponding storage device according to a request from a higher-level device, wherein each of the control software retains predetermined configuration information required for reading/writing requested data from/into the corresponding storage device according to a request from the higher-level device, wherein a plurality of the control software are managed as a redundancy group, and wherein control software deployment method comprises: a first step of deploying each of the plurality of control software configuring the redundancy group in respectively different storage nodes so as to distribute a load of each of the storage nodes; and a second step of synchronously updating the configuration information retained in each of the control software belonging to the same redundancy group.

Advantageous Effects of the Invention

According to the present invention, it is possible to realize a storage system and a control software deployment method capable of effectively utilizing information processing resources as an overall system. Other objects, configurations and effects will become apparent based on the explanation of the ensuing embodiments.

BRIEF DESCRIPTION OF DRAWINGS

FIG. 4 is a chart showing a configuration example of the logical-physical conversion table.

FIG. 5 is a chart showing a configuration example of the storage node management table.

FIG. 6 is a chart showing a configuration example of the control software management table.

FIG. 17 is a flowchart showing the processing routine of the migration target control software determination processing.

DESCRIPTION OF EMBODIMENTS

Figure 1:
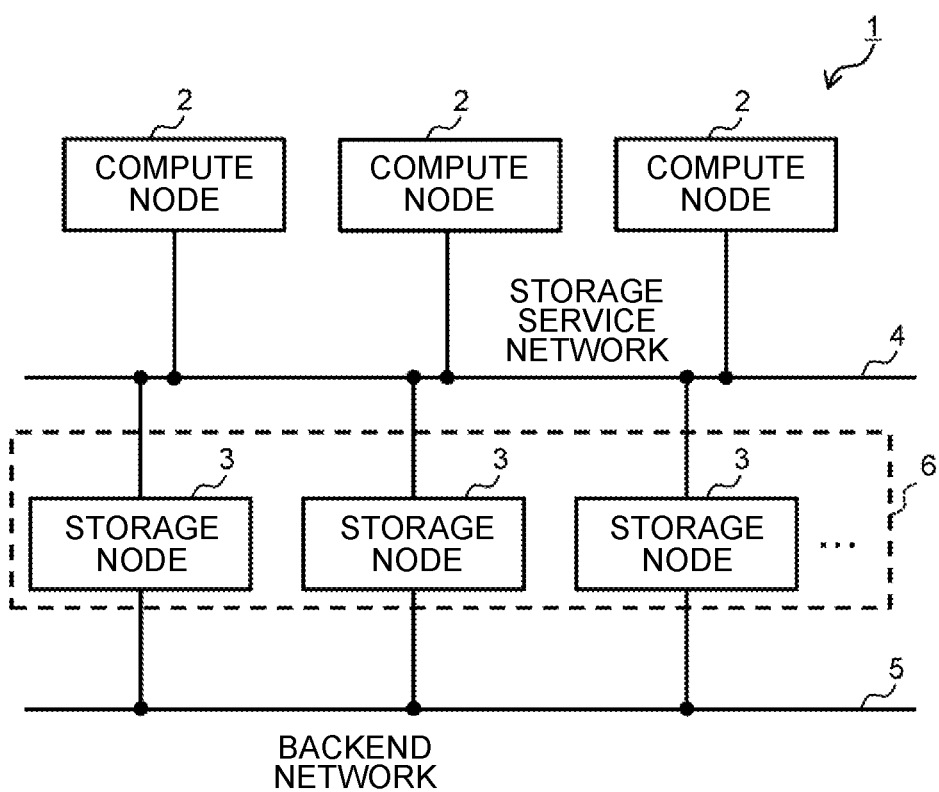
FIG. 1 is a block diagram showing the overall configuration of the information processing system according to this embodiment.

An embodiment of the present invention is now explained in detail with reference to the appended drawings. The following descriptions and drawings are illustrated for explaining the present invention, and certain contents have been omitted or simplified as needed in order to clarify the explanation. Moreover, all combinations of the features explained in the embodiments may not be required for achieving the solution of the invention. Without limitation to the embodiments of the present invention, any and all applications that coincide with the concept of the present invention are covered by the technical concept of the present invention. The present invention may be subject to various additions or changes within the scope of the present invention by those skilled in the art. The present invention can also be worked based on various other modes. Unless specifically limited, the respective constituent elements may be plural or singular.

In the ensuing explanation, while various types of information will be explained using expressions such as "table", "chart", "list", and "queue", the various types of information may also be expressed as other data structures. In order to indicate that certain information is not dependent on a data structure, "XX table", "XX list" and the like are referred to as "XX information". Expressions such as "identification information", "identifier", "name", "ID", and "number" are used in order to explain the contents of each piece of information, and these expressions may be mutually substituted.

Moreover, in the ensuing explanation, reference characters or common numbers in such reference characters are used when explaining similar elements without differentiation, and a reference character of a specific element is used, or an ID assigned to that element is used in substitute for such reference character, when differentiating and explaining similar elements.

Moreover, in the ensuing explanation, processing that is performed by executing programs will be explained. Here, because a program performs predetermined processing by using a storage resource (for example, memory) and/or an interface device (for example, communication port) as needed by being executed by at least one or more processors (for example, CPUs), the subject of processing may also be indicated as being the processor. Similarly, the subject of processing that is performed by executing programs may also be a controller, a device, a system, a computer, a node, a storage system, a storage apparatus, a server, a management computer, a client, or a host equipped with a processor. The subject of processing (for example, processor) that is performed by executing programs may also include a hardware circuit which performs a part or all of the processing. For example, the subject of processing that is performed by executing programs may include a hardware circuit which executes encryption and decryption, or compression and decompression. The processor operates as a function part which realizes predetermined functions by being operated according to programs. A device and a system including a processor are a device and a system including such function parts.

Programs may also be installed from a program source into a device such as a computer. The program source may be, for instance, a program distribution server or a computer-readable storage media. When the program source is a program distribution server, the program distribution server includes a processor (for example, CPU) and a storage resource, and the storage resource may additionally store a distribution program and programs to be distributed. Furthermore, as a result of the processor of the program distribution server executing the distribution program, the processor of the program distribution server may distribute the programs to be distributed to other computers. Moreover, in the ensuing explanation, two or more programs may be realized as one program, and one program may be realized as two or more programs.

(1) Configuration of Information Processing System According to this Embodiment

FIG. 1 is a diagram showing the configuration of the information processing system 1 according to this embodiment. The information processing system 1 is configured by comprising a plurality of compute nodes 2, and a plurality of storage nodes 3.

The respective compute nodes 2 and the respective storage nodes 3 are connected via a storage service network 4 configured, for example, from a Fibre Channel, Ethernet (registered trademark), InfiniBand or wireless LAN (Local Area Network), and the respective storage nodes 3 are connected via a backend network 5 configured, for example, from a LAN, Ethernet (registered trademark), InfiniBand or wireless LAN.

However, the storage service network 4 and the backend network 5 may be configured from same network, and the respective compute nodes 2 and the respective storage nodes 3 may also be connected to a management network other than the storage service network 4 and the backend network 5.

The compute node 2 is a general purpose computer device which functions as a host (higher-level device) to the storage node 3. Note that the compute node 2 may also be a virtual computer device such as a virtual machine. The compute node 2 reads and writes data from and into the storage node via the storage service network based on the user's operation or according to a request from an installed application program.

The storage node 3 is a service device which provides a storage area to the compute node 2 for reading and writing data. The storage node 3 may also be a virtual machine. Moreover, the storage node 3 may also be configured to reside in the same physical node as the compute node 2. In the case of this embodiment, the respective storage nodes 3 are collectively managed as a group referred to as a cluster 6 together with one or more other storage nodes 3 as shown in FIG. 1. While the example of FIG. 1 illustrates a case where only one cluster 6 is set, a plurality of clusters 6 may also be set in the information processing system 1. The cluster 6 may also be referred to as a "distributed storage system".

Figure 2:
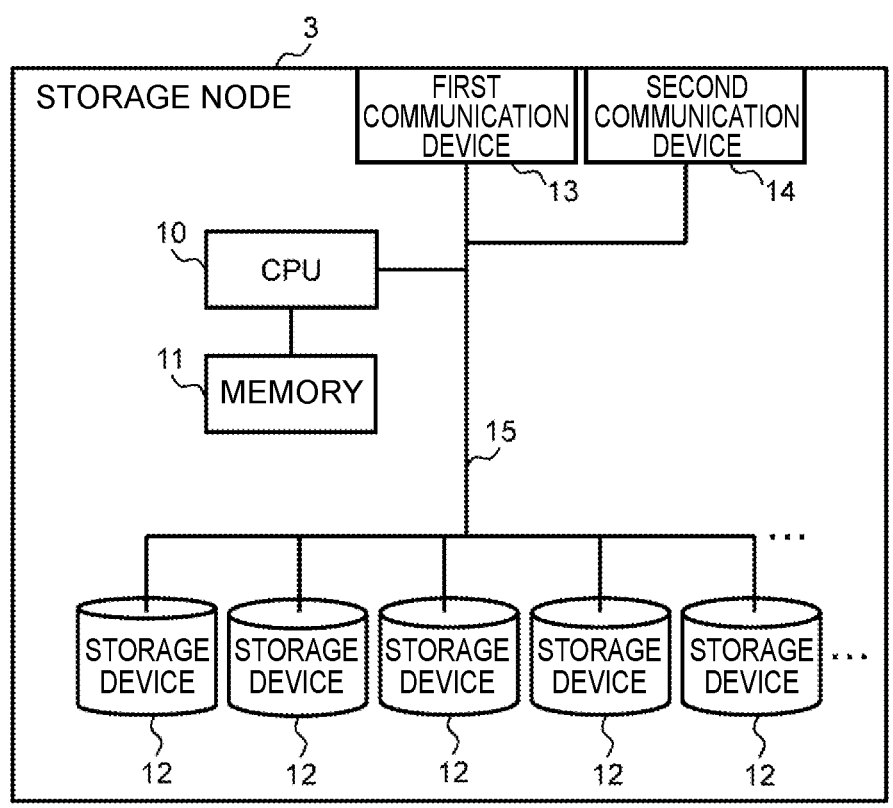
FIG. 2 is a block diagram showing the schematic configuration of the storage node.

The storage node 3 comprises, as shown in FIG. 2, one or more CPUs (Central Processing Units) 10, one or more memories 11, a plurality of storage devices 12, and one or more first and second communication devices 13, 14. The storage node 3 is configured from a general purpose physical server device in which the CPU 10 and the storage device 12, and the first and second communication devices 13, 14, are connected via an internal network 15.

The CPU 10 is a processor which governs the operational control of the overall storage node 3. Moreover, the memory 11 is configured from a volatile semiconductor memory such as an SRAM (Static RAM (Random Access Memory)) or a DRAM (Dynamic RAM), or a non-volatile semiconductor memory, and is used as a work memory of the CPU 10 for temporarily storing various programs and necessary data. By executing the programs stored in the memory 11 with at least one or more CPUs 10, various types of processing as the overall storage node 3 are executed as described later.

The storage device 12 is configured from a large capacity non-volatile storage device such as an HDD (Hard Disk Drive), an SSD (Solid State Drive) or an SCM (Storage Class Memory), is connected via an interface such as NVMe (Non-Volatile Memory Express), SAS (Serial Attached SCSI (Small Computer System Interface)), or SATA (Serial ATA (Advanced Technology Attachment)), and provides a storage area for reading and writing data according to a read request or a write request from the compute node 2.

The first communication device 13 is an interface for the storage node 3 to communicate with the compute node 2 via the storage service network 4, and is configured, for example, from a Fibre Channel card, an Ethernet (registered trademark) card, an InfiniBand card, or a wireless LAN card. The first communication device 13 performs protocol control during communication with the compute node 2.

The second communication device 14 is an interface for the storage node 3 to communicate with other storage nodes via the backend network 5, and is configured, for example, from a Fibre Channel card, an Ethernet (registered trademark) card, an InfiniBand card, a wireless LAN card, or a PCIe host adapter. The second communication device 14 performs protocol control during communication with other storage nodes 3.

Note that, in the case of this embodiment, the respective storage nodes 3 are collectively managed as a group referred to as a cluster 6 together with one or more other storage nodes 3 as shown in FIG. 1. While the example of FIG. 1 illustrates a case where only one cluster 6 is set, a plurality of clusters 6 may also be set in the information processing system 1. The cluster 6 may also be referred to as a distributed storage system.

(2) Flow of Various Types of Processing in Information Processing System (2-1) Programs and Information Stored in Memory of Each Storage Node The flow of various types of processing in the information processing system 1 is now explained. Here, the programs and information stored in the memory 11 (FIG. 2) of each storage node 3 in relation to the various functions are foremost explained with reference to FIG. 3 to FIG. 6.

Figure 3:
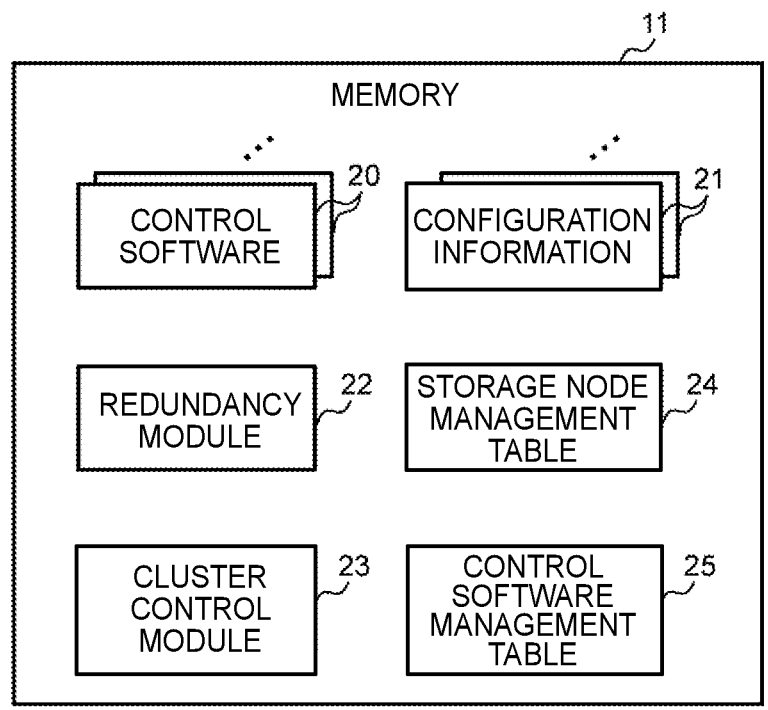
FIG. 3 is a block diagram explaining the programs and information stored in the memory of the storage node in relation to the redundancy function.

As shown in FIG. 3, the memory 11 of each storage node 3 stores a plurality of control software (this is hereinafter referred to as the "control software") 20, a plurality of configuration information 21 prepared in correspondence with each control software 20, a redundancy module 22, a cluster control module 23, a storage node management table 24 and a control software management table 25.

The control software 20 is software which functions as a storage controller of an SDS (Software Defined Storage). The control software 20 has a function of receiving a read request or a write request from the compute node 2, and reading or writing data from or into the corresponding storage device 12 (FIG. 2). The control software 20 may also be referred to as a "storage control unit" or a "storage control program".

Figure 7:
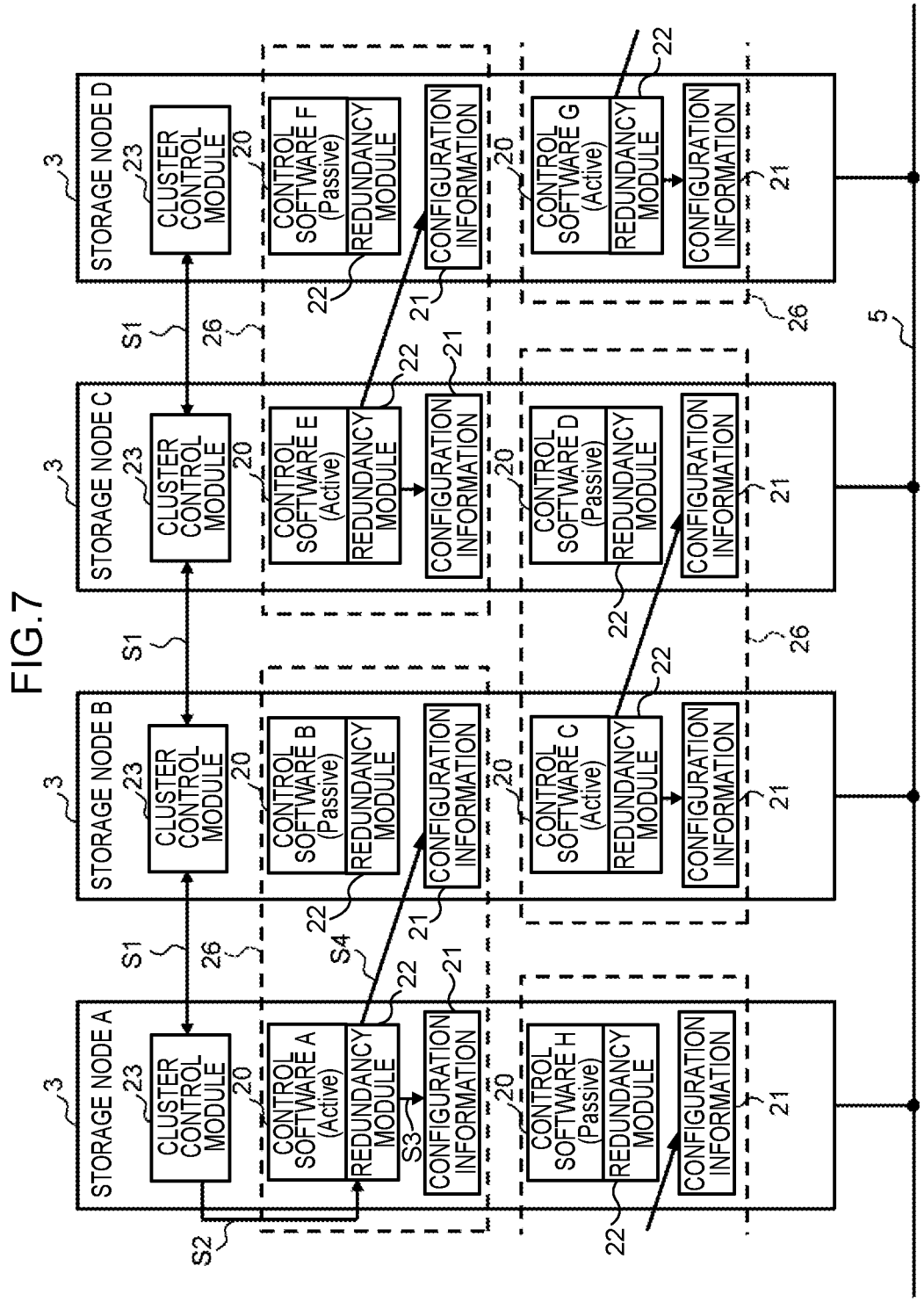
FIG. 7 is a block diagram explaining the redundancy function according to this embodiment.

In the case of this embodiment, as shown in FIG. 7, the respective control software 20 loaded in the storage node 3 are managed as one group for redundancy (this is hereinafter referred to as the "redundancy group") 26 together with one or more other control software 20 which are each loaded in other mutually different storage nodes 3.

Note that FIG. 7 shows a case of configuring the redundancy group 26 with two control software 20, and, while the ensuing explanation will be provided on the premise that the redundancy group 26 is configured from two control software 20, the redundancy group 26 may also be configured from three or more control software 20.

In the redundancy group 26, at least one control software 20 is set to a status of being able to receive a read request or a write request from the compute node 2 (status of the active system; this is hereinafter referred to as the "active mode"), and the remaining control software 20 are set to a status of not being able to receive a read request or a write request from the compute node 2 (status of the standby system; this is hereinafter referred to as the "passive mode").

Accordingly, a redundancy group 26 configured from two control software 20 will take on either the configuration where the two control software 20 are both set to the active mode (this is hereinafter referred to as the "active-active configuration"), or the configuration where one control software 20 is set to the active mode and the other control software 20 is set to the passive mode as a backup (this is hereinafter referred to as the "active-passive configuration").

With a redundancy group 26 that adopted the active-passive configuration, when a failure occurs in the control software 20 set to the active mode or the storage node 3 on which that control software 20 is running, or that storage node 3 is removed from the cluster 6 (i.e., the storage node 3 is decreased), the status of the control software 20 that was previously set to the passive mode is switched to the active mode. Consequently, when the control software 20 that was set to the active mode can no longer be operated, the I/O (Input/Output) processing that was being executed by that control software 20 can be succeeded by the control software 20 that was previously set to the passive mode (failover function).

In order to realize this kind of failover function, the plurality of control software 20 belonging to the same redundancy group 26 constantly retain the configuration information 21 of the same contents. The configuration information 21 is information which is required for the control software 20 to execute various functions including the foregoing capacity virtualization function, a tiering (hierarchical storage control) function of migrating data having a high access frequency to a storage area having a faster response speed, a deduplication function of deleting duplicate data among the stored data, a compression function of compressing and storing data, a Snapshot function of retaining the status of data at a certain point in time, and a remote copy function of synchronously or asynchronously copying data to a remote location as a disaster countermeasure.

When the configuration information 21 of the active mode control software 20 configuring the redundancy group 26 is updated, a difference in the configuration information 21 before and after such update is transferred as difference data to the other control software 20 configuring the redundancy group 26, and the other control software update their own configuration information 21 based on the difference data. The configuration information 21 retained in the respective control software 20 configuring the redundancy group 26 is thereby constantly maintained in a synchronous status.

As a result of the two control software 20 configuring the redundancy group 26 constantly retaining the same configuration information 21, even when a failure occurs in the control software 20 set to the active mode or the storage node 3 loaded with the control software 20, or such storage node 3 is removed, the processing that was being executed by that control software 20 can be immediately succeeded by another control software 20 within the same redundancy group 26.

The redundancy module 22 is a program with the function of constantly synchronizing the configuration information 21 retained in the respective control software 20 in the same redundancy group 26. In effect, when any one of the control software 20 in its own storage node 3 updates its own configuration information 21, the redundancy module 22 sends, as difference data, a difference in the configuration information 21 before and after such update to the storage node 3 loaded with the other control software 20 belonging to the same the redundancy group 26. Here, the redundancy module 22 designates the control software 20 in which the configuration information 21 should be updated based on the difference data. Furthermore, the redundancy module 22 of the storage node 3 that received the difference data updates the configuration information 21 retained in the designated control software 20 based on the difference data. The redundancy module 22 may also be referred to as "redundancy software" or a "redundancy program".

The cluster control module 23 is a program with the function of transferring the I/O (Input/Output) request, which is configured from a write request or a read request issued from the compute node 2, to the cluster control module 23 of the corresponding storage node 3 via the backend network 5, or delivering the foregoing I/O request transferred from another cluster control module 23 to the control software 20 of the corresponding redundancy group 26. The cluster control module 23 may also be referred to as "cluster control software" or a "cluster control program".

In effect, in the case of this embodiment, for each redundancy group 26, one or more virtual logical volumes (these are hereinafter referred to as the "virtual volumes") are defined in correspondence with that redundancy group 26, and these virtual volumes are provided to the computer node 2 as the storage area for reading/writing data.

In the foregoing case, the storage area in the virtual volume is managed by being partitioned into small areas of a predetermined size (these are hereinafter referred to as the "logical pages"). Moreover, the storage area provided by the respective storage devices 12 equipped in the storage node 3 is managed by being partitioned into small areas having the same size as the logical pages (these are hereinafter referred to as the "physical pages"). However, the logical pages and the physical pages do not need to be the same size.

Furthermore, when the compute node 2 is to read or write data from or into the intended virtual volume, the computer node 2 sends, to any one of the storage nodes 3 in the corresponding cluster 6, an I/O request which designates the identifier (LUN: Logical Unit Number) of the virtual volume as the read/write destination of that data, the top logical page of the read/write destination of that data in the virtual volume, and the data length of that data.

Consequently, the cluster control module 23 of the storage node 3 that received the foregoing I/O request transfers that I/O request, via the backend network 5, to the cluster control module 23 of the respective storage nodes 3, in which the control software 20 of the redundancy group 26 is associated with the read/write destination virtual volume designated in the received I/O request.

Moreover, the cluster control module 23 that received the foregoing I/O request delivers that I/O request to the control software 20 of the redundancy group 26 associated with the virtual volume that was designated as the read/write destination in the I/O request. Subsequently, among the control software 20 to which the I/O request was delivered, the control software 20 set to the active mode, in response to the I/O request, dynamically assigns one of the physical pages to the logical page that was designated as the data write destination in the I/O request when the I/O request is a write request, and reads/writes data from/into the physical page that was assigned to the logical page.

As means for executing the foregoing series of processing, the cluster control module 23 is sharing information such as in which storage node 3 each control software 20 existing in the cluster 6 has been deployed, to which redundancy group 26 each control software 20 belongs, and whether each control software 20 has been set to the status of an active mode or a passive mode, and stores and manages the foregoing information in the control software management table 25 described later.

Meanwhile, the configuration information 21 is configured from information required for the control software 20 to realize various functions such as the capacity virtualization function, the tiering (hierarchical storage control) function, the Snapshot function, the remote copy function, the deduplication function, and the compression function described above.

FIG. 4 shows a logical-physical conversion table 27 which configures a part of the configuration information 21. The logical-physical conversion table 27 is a table that is used for managing the correlation of the foregoing logical pages and the physical pages in relation to the capacity virtualization function, and is configured by comprising, as shown in FIG. 4, a LUN column 27A, a logical page column 27B and a physical page column 27C. In the logical-physical conversion table 27, one line corresponds to one logical page.

The LUN column 27A stores the LUN of the virtual volume that was assigned by the cluster 6 to each virtual volume to be provided to the compute node 2, and the logical page column 27B stores the identifier (logical page number) that is assigned to each logical page in the corresponding virtual volume.

Moreover, the physical page column 27C is separated into a node ID column 27CA, a drive number column 27CB and a sector number column 27CC. The node ID column 27CA stores an identifier (node ID) that is unique to the storage node 3 which was assigned to that storage node which provides the physical page assigned to the corresponding logical page, and the drive number column 27CB stores an identifier (drive number) that is unique to the storage device 12 which was assigned to that storage device 12 (FIG. 2) which provides the physical page PP. Furthermore, the sector number column 27CC stores an identifier (sector number) that is unique to the sector which was assigned to that storage area (sector) corresponding to the physical page PP in the corresponding storage device 12.

Accordingly, the case of FIG. 4 shows that, for instance, a storage area (sector) having a sector number of "0x00010000" in the storage device 12 having a drive number of "1" in the storage node 4 having a node ID of "0" has been assigned as the physical page to the logical page having a logical page number of "0" of the virtual volume having a LUN of "1".

Moreover, the storage node management table 24 is a table that is used for managing the load status of the respective storage nodes 3 in the same cluster 6, and is configured by comprising, as shown in FIG. 5, a node ID column 24A, a status column 24B, a capacity column 24C, a used capacity column 24D, a CPU load column 24E, a memory amount column 24F, a used memory amount column 24G, a communication band column 24H, a used communication band column 24I and a failure group ID column 24J. In the storage node management table 24, one line corresponds to one storage node 3.

The node ID column 24A stores the node ID of the respective storage nodes 3 configuring the cluster 6, and the status column 24B stores the current status ("normal" or "abnormal") of the corresponding storage node 3. Moreover, the capacity column 24C stores the capacity of all storage devices of the corresponding storage node 3, and the used capacity column 24D stores the current used capacity of the storage device in the corresponding storage node 3.

Furthermore, the CPU load column 24E stores the current utilization of the CPU 10 (FIG. 2) in the corresponding storage node 3, the memory amount column 24F stores the capacity of the memory 11 (FIG. 2) in that storage node 3, and the used memory amount column 24G stores the current used amount of the memory 11 in the corresponding storage node 3.

Furthermore, the communication band column 24H stores the size of the communication band of the backend network 5 that is available to the corresponding storage node 3, and the used communication band column 24I stores the band amount of the backend network 5 that is currently being used by that storage node 3 for communicating with other storage nodes 3.

Furthermore, the failure group ID column 24J stores the group ID of the failure group belonging to the corresponding storage node 3. Here, the term "failure group" refers to the group of the storage nodes 3 that will be subject to a similar failure when a failure occurs in the power source or the like, such as when the same power source is being shared.

The information stored in the storage node management table 24 is information that is shared by the cluster control modules 23 of all storage nodes 3 configuring the same cluster 6. Accordingly, as means for sharing the same information among the cluster control modules 23 of the respective storage nodes 3 in the same cluster 6, one cluster control module 23 is selected based on a predetermined method, as the representative cluster control module 23, among the cluster control modules 23 equipped in the respective storage nodes 3 configuring the cluster 6.

Subsequently, the representative cluster control module 23 periodically collects necessary information from the cluster control modules 23 of other storage nodes 3, and updates the storage node management table 24, which it is managing, based on the collected information. Moreover, the representative cluster control module 23 transfers the collected information to the cluster control modules 23 of the respective storage nodes 3 in that cluster 6 and thereby causes such cluster control modules 23 to update their own storage node management table 24 to the latest status.

However, the configuration may also be such that the cluster control models 23 of the respective storage nodes 3 periodically send necessary information to the cluster control models 23 of all other storage nodes 3 in the same cluster 6, and the cluster control modules 23 of the respective storage nodes 3 update the storage node management table 24 in their own node based on the received information.

The control software management table 25 is a table that is used for the cluster control module 23 to manage all control software 20 existing in the cluster 6, and is configured by comprising, as shown in FIG. 6, a control software ID column 25A, a status column 25B, a group ID column 25C, an operating node ID column 25D, a used capacity column 25E, a CPU load column 25F, a used memory amount column 25G, a used communication band column 25H and a LUN column 25I. In the control software management table 25, one line corresponds to one control software 20.

The control software ID column 25A stores an identifier (control software ID) that is unique to the control software 20 which was assigned to that control software 20 which is currently running on the corresponding cluster 6, and the status column 25B stores the current status of the corresponding control software 20. As the status of the control software 20, there are, in addition to the foregoing active mode ("Active") and passive mode ("Passive"), dead ("Dead") as an inoperable status caused by a failure or the like, and stop ("Stop") as a status where the I/O processing is stopped for maintenance or the like.

Moreover, the group ID column 25C stores an identifier (group ID) that is unique to the redundancy group 26 which was assigned to that redundancy group 26 (FIG. 7) configuring the corresponding control software 20, and the operating node ID column 25D stores the node ID of the storage node 3 in which the corresponding control software 20 is running. Moreover, the used capacity column 25E stores the total capacity of the storage areas that are currently being used by the corresponding control software 20.

Moreover, the CPU load column 25F stores the current utilization of the CPU 10 (FIG. 2) for running the corresponding control software 20, and the used memory amount column 25G stores the capacity of the memory 11 (FIG. 2) which is currently being used for the corresponding control software 20. Furthermore, the used communication band column 25H stores the band amount of the backend network 5 that is currently being used by the corresponding control software 20 for communicating with other storage nodes 3.

The LUN column 25I stores the LUN (Logical Unit Number: volume number) of the identification information for identifying the virtual volume provided to the compute node 2, and is managed by being associated with the control software ID 25A of the control software which manages the virtual volume identified by the LUN.

When the cluster control module 23 of each storage node 3 receives an I/O request (read request or write request) from the compute node 2, the cluster control module 23 acquires the LUN included in the I/O request, and uses the control software management table 25 to identify the control software ID 25A and the operating node ID associated with that LUN. Consequently, the cluster control module 23 of each storage node 3 is able to identify the control software which is managing the virtual volume to become the I/O request destination, and the deployment destination node of that control software. Note that the LUN of the LUN column 25I may also be managed by being associated with the group ID 25C of the redundancy group corresponding to the virtual volume that is identified with the LUN. If the group ID can be identified from the LUN included in the I/O request based on the control software management table 25, it will also be possible to identify the control software ID included in the redundancy group identified with the group ID, and the control software which is identified with the control software ID.

The information stored in the control software management table 25 is also information which is shared by the cluster control modules 23 of all storage nodes 3 configuring the same cluster 6. Thus, the representative cluster control module 23 periodically collects necessary information from the cluster control modules 23 of other storage nodes 3, and updates the control software management table 25, which it is managing, based on the collected information. Moreover, the representative cluster control module 23 transfers the collected information to the cluster control modules 23 of the respective storage nodes 3 in that cluster 6 and thereby causes such cluster control modules 23 to update their own storage node management table 24 to the latest status.

(2-2) Flow of Various Types of Processing (2-2-1) Flow of Write Processing

FIG. 7 shows the flow of processing in the information processing system 1 when a write request is given to one of the storage nodes 3 in the cluster 6 from the compute node 2 during a normal period.

In FIG. 7, "storage node A" to "storage node D" respectively represent the storage node 3, and "control software A" to "control software H" respectively represent the control software 20. Furthermore, FIG. 7 shows a case where the "control software A" running on the "storage node A" and the "control software B" running on the "storage node B" configure a redundancy group 26, the "control software C" running on the "storage node B" and the "control software D" running on the "storage node C" configure a redundancy group 26, the "control software E" running on the "storage node C" and the "control software F" running on the "storage node D" configure a redundancy group 26, and the "control software G" running on the "storage node D" and the "control software H" running on the "storage node A" configure a redundancy group 26. Moreover, here, let it be assumed that the configuration of the respective redundancy groups 26 created based on the redundancy of the control software 20 is an active-passive configuration.

In the foregoing case, during a normal period, the cluster control modules 23 of the respective storage nodes 3 share information such as the load status of the CPU 10 (FIG. 2) and the used amount of the memory 11 (FIG. 2) of the respective storage nodes 3 described above, and store and manage such information in the storage node management table 24 and the control software management table 25 (S1).

Subsequently, when a write request from the compute node 2 is given to any one of the storage nodes 3 in the cluster 6, the cluster control module 23 of the storage node 3 uses the control software management table 25 and transfers the write request to each control software 20 of the corresponding redundancy group 26 via the cluster control module 23 of the corresponding storage node 3 based on the LUN included in the write request as described above. Among the control software 20 to which the write request was transferred, the control software 20 set to the active mode executes the write processing. Note that the cluster control modules 23 may transfer the write request only to the control software 20 set to the active mode.

Here, let it be assumed that the write request indicates, as the write destination, the virtual volume associated with the redundancy group 26 configured from the "control software A" and the "control software B". Moreover, in the redundancy group 26, let it be assumed that the "control software A" is set to the active mode, and the "control software B" is set to the passive mode. Accordingly, in the foregoing case, the "control software A" set to the active mode will execute the write processing according to the write request.

When the foregoing write processing is executed, the redundancy module 22 of the "storage node A" loaded with the "control software A", which executed the write processing, acquires, from the cluster control modules 23 in the same storage node 3 ("storage node A"), the control software ID of the control software 20 ("control software B") configuring the redundancy group 26 together with the "control software A" that executed the write processing, and the IP address on the backend network 5 of the storage node 3 ("storage node B") loaded with the control software 20 (S2).

Moreover, the redundancy module 22 of the "storage node A" updates the configuration information 21 retained in the "control software A" according to the processing contents of the write processing (S3), and sends, via the backend network 5, the difference data representing the difference before and after the update of the configuration information 21 to the storage node 3 ("storage node B") of the IP address acquired in step S2 (S4). Here, the redundancy module 22 designates the "control software B", which configures the redundancy group 26 together with the "control software A", as the control software 20 to update the configuration information 21 based on the difference data.

Consequently, the redundancy module 22 of the "storage node B" that received the difference data updates the configuration information 21 retained in the "control software B" based on the difference data in the same manner as the configuration information 21 retained in the "control software A".

Accordingly, the two configuration information 21 retained respectively in the two control software 20 ("control software A" and "control software B") configuring the same redundancy group 26 are maintained to have the same contents.

(2-2-2) Flow of Processing Upon Occurrence of Failure in Storage Nodes

Figure 8:
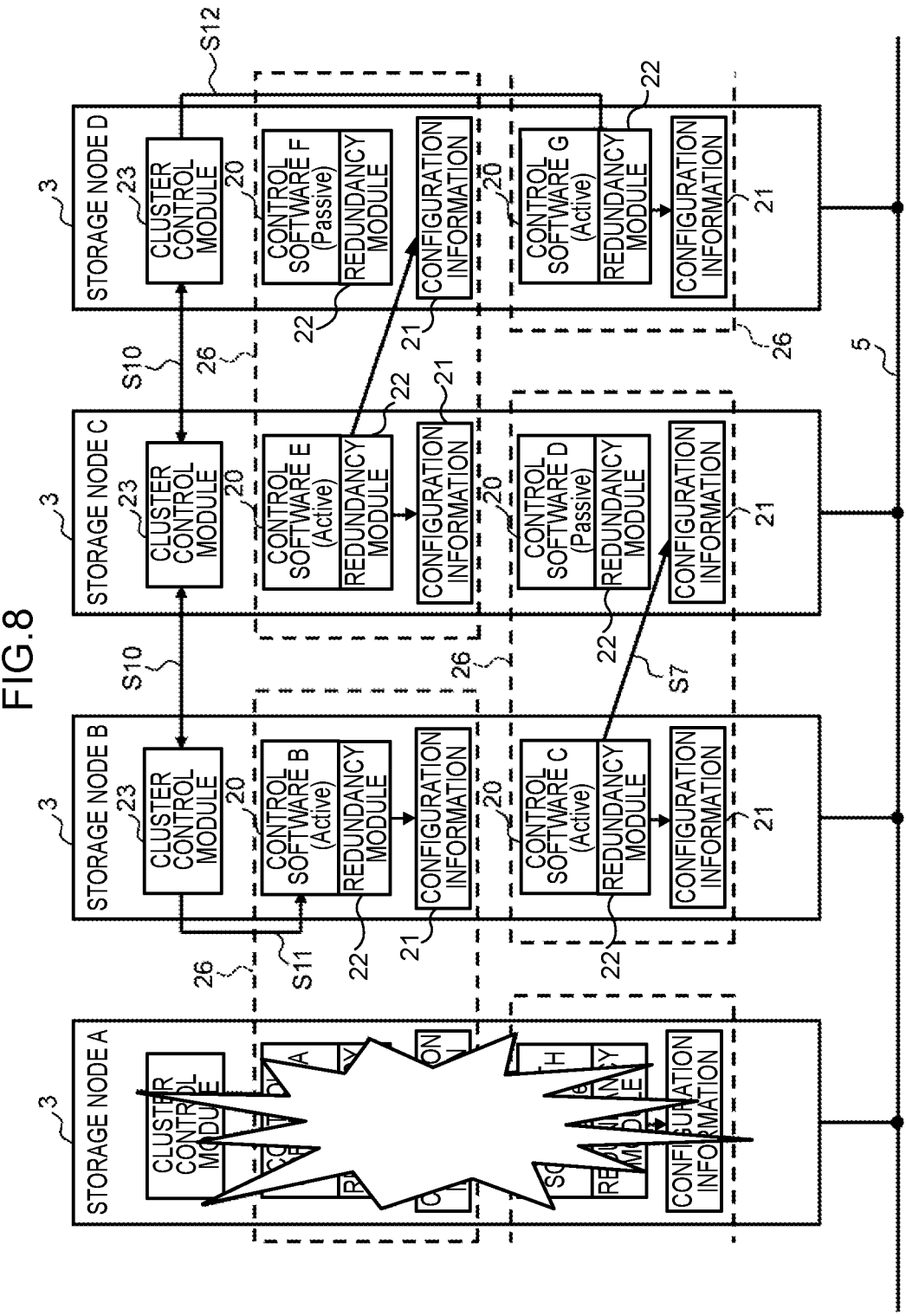
FIG. 8 is a block diagram explaining the redundancy function according to this embodiment.

The flow of processing when a failure occurs in any one of the storage nodes 3 configuring the cluster 6 is now explained. Note that, here, as shown in FIG. 8, explained is the flow of processing in a case where a failure occurred in the "storage node A", and the "control software A" and the "control software H" loaded in the "storage node A" become inoperable.

In the foregoing case, any one of the cluster control modules 23 that detected the foregoing failure notifies such failure to the representative cluster control module 23. Here, let it be assumed that the cluster control module 23 of the "storage node B" has been selected as the representative cluster control module 23, and that the notice has been sent to the cluster control module 23 of the "storage node B".

The representative cluster control module 23 that received the notice refers to the control software management table 25 (FIG. 6), and sends a notice to the effect that a failure has occurred in the "control software A" to the cluster control module 23 of the "storage node B" loaded with the "control software B" configuring the same redundancy group 26 as the "control software A". Moreover, the representative cluster control module 23 sends a notice to the effect that a failure has occurred in the "control software H" to the to the cluster control module 23 of the "storage node D" loaded with the "control software G" configuring the same redundancy group 26 as the "control software H" (S10).

The cluster control module 23 of the "storage node B" that received the notice changes the status of the "control software B", which was previously set to the passive mode, to the active mode (S11). Consequently, the I/O processing that was previously being executed by the "control software A" will be succeeded by the "control software B".

Moreover, the cluster control module 23 of the "storage node D" that received the notice sends a command to the redundancy module 22, which is associated with the "control software G", to the effect of refraining from transferring the difference data to the "storage node A" even when the configuration information 21 retained in the "control software G" is subsequently updated (S12).

Figure 9:
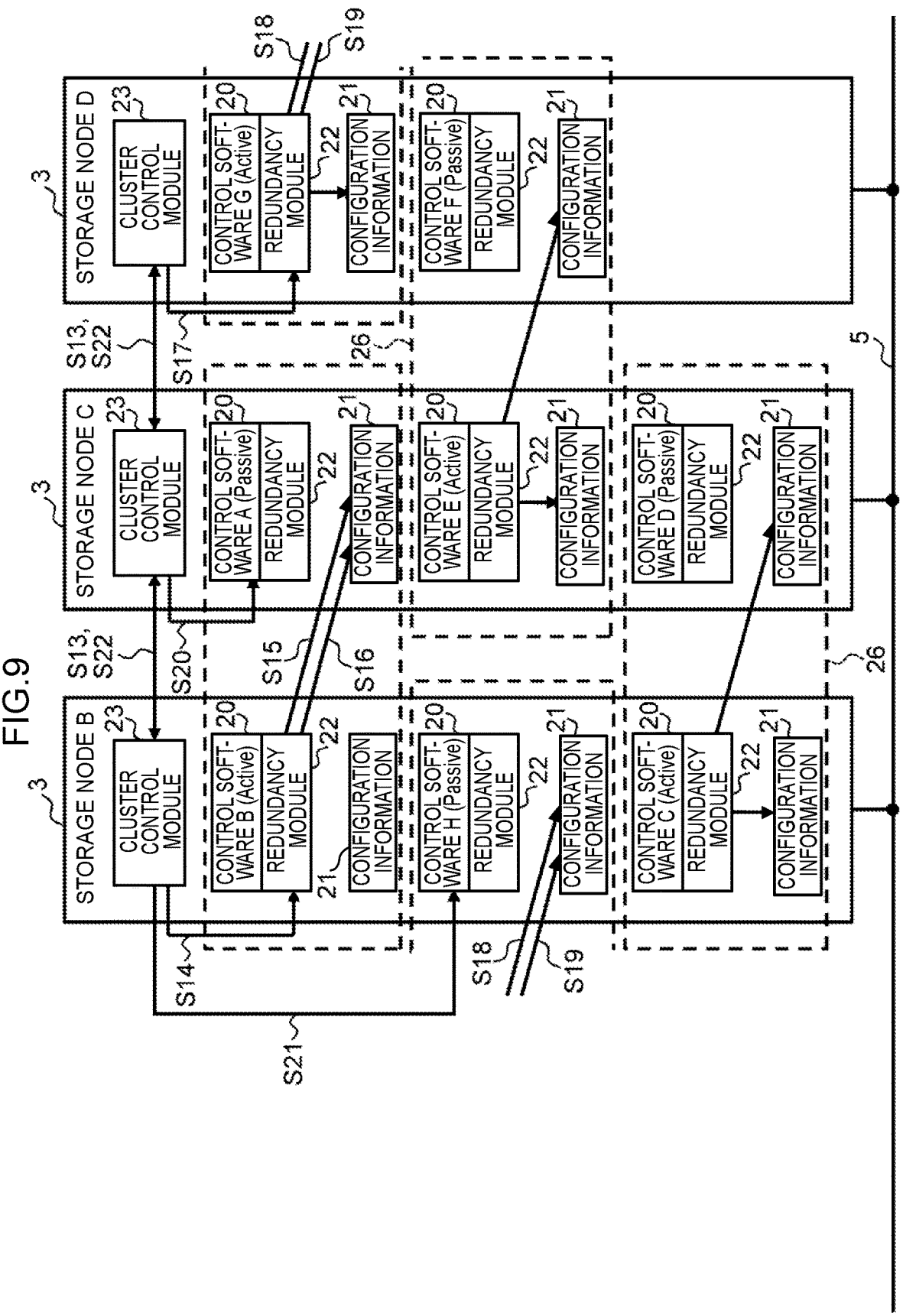
FIG. 9 is a block diagram explaining the redundancy function according to this embodiment.

Subsequently, in order to recover the redundancy configuration of the "control software B" and the "control software G", the representative cluster control module 23 determines the storage node 3 to become the new deployment destination of the "control software A" and the storage node 3 to become the new deployment destination of the "control software H", respectively, as shown in FIG. 9, and notifies the determination result to the cluster control modules 23 in the respective storage nodes 3 (S13).

Here, the representative cluster control module 23 selects as the new deployment destinations of the "control software A" and the "control software H", by referring to the storage node management table 24 (FIG. 5), a storage node 3 which is different from the storage nodes 3 in which the other control software 20 configuring the same redundancy group 26 has previously been deployed, and which belongs to a failure group that is different from the storage node 3 in which the other control software 20 configuring the same redundancy group 26 has previously been deployed. Moreover, when there are a plurality of such storage nodes 3 (storage nodes 3 that could be candidates of the new deployment destinations of the "control software A" and the "control software H"), the representative cluster control module 23 refers to the storage management table 24 and the control software management table 25, and determines the storage nodes 3 having a low load as the new deployment destinations of the "control software A" and the "control software H", respectively.

Incidentally, the term "storage nodes 3 having a low load" refers to a storage node 3 having the lowest CPU load among the candidate storage nodes 3 in which the capacity of the storage device, the CPU load, the memory amount, and the communication band of the backend network 5 of that storage node 3 do not exceed the tolerance level even when the control software 20 is deployed. Here, let it be assumed that the new deployment destination of the "control software A" has been determined to be the "storage node C", and the new deployment destination of the "control software H" has been determined to be the "storage node B", respectively. Incidentally, the term "tolerance level" refers to a level that is within the range of the capacity and memory amount of the storage device of the storage node 3 with regard to the capacity and the memory amount, 100% or less with regard to the CPU load, and within the range of the available communication band with regard to the backend network 5. Otherwise, when thresholds have been set in advance for such capacity, CPU load, memory amount and/or communication band of the backend network 5, the term "tolerance level" refers to the range within such thresholds. The same shall apply in the ensuing explanation.

The cluster control module 23 of the "storage node B" that received the notice issues a command to the redundancy module 22 in its own storage node 3 for fully copying the configuration information 21 retained in the "control software B" to the "storage node C" as the new deployment destination of the "control software A" (S14). Moreover, the redundancy module 22 that received the foregoing command transfers the configuration information 21 to the "storage node C" via the backend network 5 (S15). Subsequently, the cluster control module 23 of the "storage node C" that received the configuration information 21 stores the received configuration information 21 in the memory 11 (FIG. 2) by associating it with the "control software A".

When the full copy of the configuration information 21 retained in the "control software B" to the "storage node C" is complete, the redundancy module 22 of the "storage node B" subsequently starts to transfer the difference data, which shows the difference in comparison to the original configuration information 21, to the "storage node C" each time that the configuration information 21 retained in the "control software B" is updated, and, consequently, the configuration information 21 retained in the "control software B" and the configuration information 21 copied to the "storage node C" are synchronously updated (S16).

Similarly, the cluster control module 23 of the "storage node D" that received the foregoing notice issues a command to the redundancy module 22 in its own storage node 3 of fully copying the configuration information 21 retained in the "control software G" to the "storage node B" as the new deployment destination of the "control software H" (S17). Moreover, the redundancy module 22 that received the foregoing command transfers the configuration information 21 to the "storage node B" via the backend network 5 (S18). Subsequently, the cluster control module 23 of the "storage node B" that received the configuration information 21 stores the received configuration information 21 in the memory 11 by associating it with the "control software H".

Even when the full copy of the configuration information 21 retained in the "control software G" to the "storage node B" is complete, the redundancy module 22 of the "storage node D" subsequently starts to transfer the difference data, which shows the difference in comparison to the original configuration information 21, to the "storage node B" each time that the configuration information 21 retained in the "control software G" is updated, and, consequently, the configuration information 21 retained in the "control software G" and the configuration information 21 copied to the "storage node B" are synchronously updated (S19).

Subsequently, the cluster control module 23 of the "storage node C" activates the control software 20 installed in the "storage node C" in the passive mode as the new "control software A" (S20). Similarly, the cluster control module 23 of the "storage node B" activates the control software 20 installed in the "storage node B" in the passive mode as the new "control software H" (S21). The redundancy configuration of the "control software B" and the "control software G" is thereby recovered.

The representative cluster control module 23 subsequently updates the control software management table 25, which it is managing, according to the foregoing configuration change. Specifically, the representative cluster control module 23 changes the node ID stored in the operating node ID column 25D (FIG. 6) of the line corresponding to the "control software A" in the control software management table 25 to the node ID of the "storage node C" as the new deployment destination of the "control software A", and changes the node ID stored in the operating node ID column 25D of the line corresponding to the "control software H" in the control software management table 25 to the node ID of the "storage node B" as the new deployment destination of the "control software H".

Moreover, the representative cluster control module 23 notifies the contents of the thus updated control software management table 25 that it is managing to the cluster control modules 23 of the respective storage nodes 3 in the same cluster (S22). Consequently, each cluster control module 23 that received the foregoing notice updates the control software management table 25, that it is managing, to be the same contents as the contents of the new control software management table 25 notified from the representative cluster control module 23.

The series of processing performed when a failure occurs in the "storage node A" is thereby ended.

Note that, in the foregoing example, as shown in FIG. 9, the configuration will be such that the three control software 20 of "control software B", "control software C" and "control software H" run on the "storage node B", and the three control software 20 of "control software A", "control software D" and "control software E" run on the "storage node C". However, in order to suppress the CPU load and the memory consumption, by merging the configuration information 21 of the control software 20 and causing certain control software 20 to succeed the I/O processing the other control software 20, the number of control software 20 to run on the storage node 3 may be reduced.

For instance, in the example of FIG. 9, the configuration information 21 retained in the "control software C" can be merged with the configuration information 21 retained in the "control software B", the I/O processing of the "control software C" can be succeeded by the "control software B", and the "control software C" and the "control software D" belonging to the same redundancy group can be stopped.

Moreover, the flow of processing that is executed in the cluster 6 upon decreasing the storage node 3 of the cluster 6 (removing any one of the storage nodes 3) is also basically the same as above. However, in the foregoing case, the administrator of the information processing system 1 designates in advance the storage node 3 to be removed, and issues, to the representative cluster control module 23, a command to the effect that all control software 20 running on the storage node 3 should be migrated to other storage nodes 3 in the same cluster 6 (this is hereinafter referred to as the "all control software migration command").

The representative cluster control module 23 that received the all control software migration command executes the processing of step S11 onward according to the all control software migration command upon exchanging the "storage node 3 to be removed" and the foregoing "storage node 3 that was subject to a failure". Consequently, the administrator can remove, from the cluster 6, the storage node 3 to be removed after the processing up to foregoing step S22 is completed.

(2-2-3) Flow Upon Adding Storage Node

Figure 10:
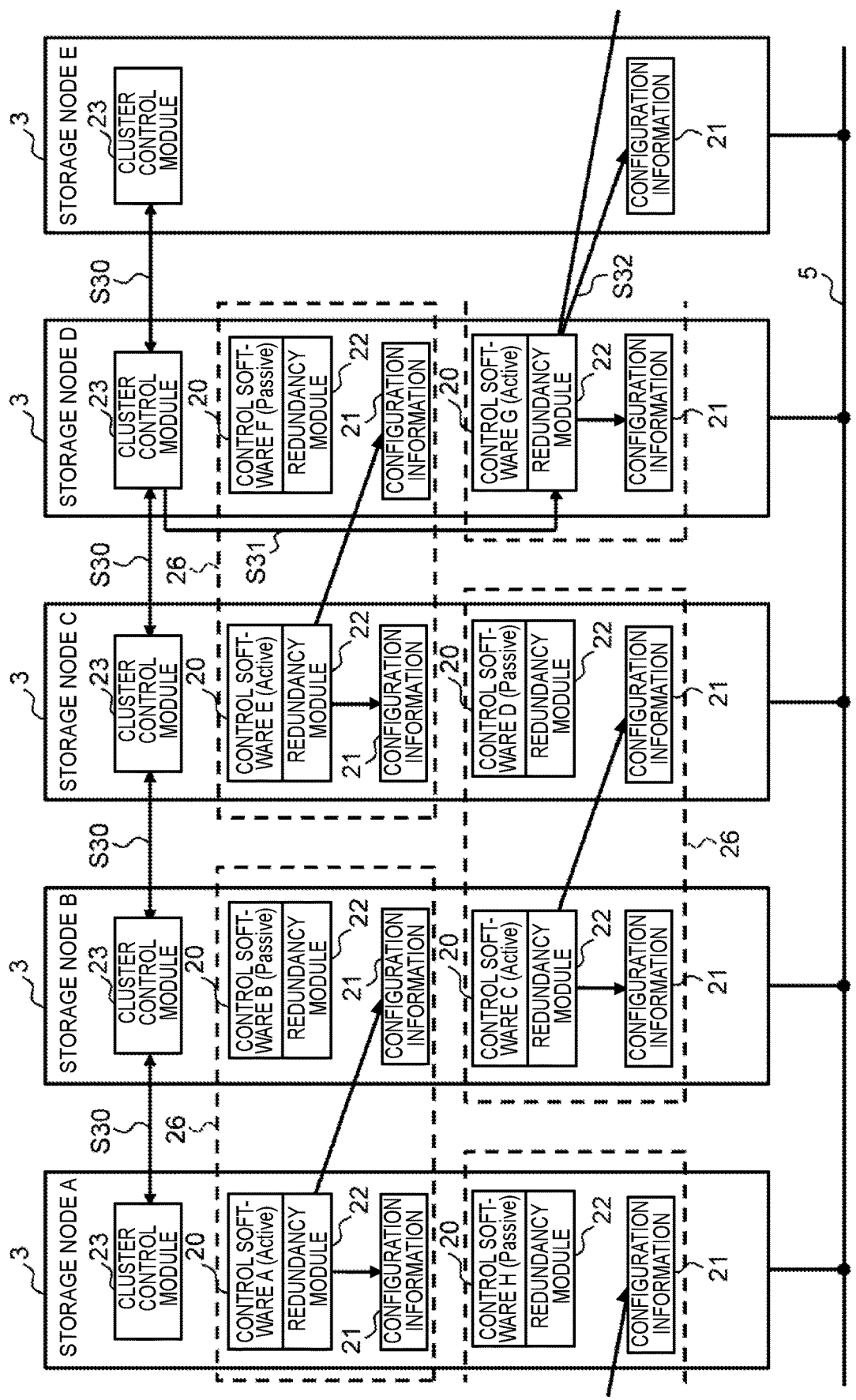
FIG. 10 is a block diagram explaining the redundancy function according to this embodiment.

The flow of processing that is executed in the cluster 6 when a storage node 3 referred to as the "storage node E" is to be newly added to the cluster 6, as shown in FIG. 10, from the status of FIG. 7, is now explained.

Foremost, when the "storage node E" is added and the cluster control module 23 loaded in the "storage node E" is thereafter activated, information such as the CPU load and the memory consumption of the "storage node E" is notified from the cluster control module 23 to the cluster control modules 23 of the respective storage nodes 3 in the cluster 6.

Subsequently, the foregoing representative cluster control module 23 that received the foregoing notice (cluster control module 23 of the "storage node B") determines the control software 20 to be redeployed in the "storage node E", which was added among the "control software A" to the "control software H", which were loaded in any one of the storage nodes 3 among the "storage node A" to the "storage node D", for the load leveling (rebalance) of the respective storage nodes 3. The representative cluster control module 23 notifies the determination result to the respective cluster control modules 23 in the cluster 6 (S30).

Here, based on the CPU load and the unused memory amount of the "storage node A" to the "storage node E" and the size of the unused band of the backend network 5, the representative cluster control module 23 determines the control software 20 to be redeployed in the "storage node E" so as to level the foregoing CPU load and so on, and so that a plurality of control software 20 of the active mode will not run on the same storage node 3 to the extent possible. Here, let it be assumed that the "control software H" loaded in the "storage node A" has been determined as the control software 20 to be redeployed in the "storage node E".

Meanwhile, when the cluster control module 23 of the "storage node D" loaded with the "storage node D", which configures the redundancy group 26 together with the "control software H", receives the foregoing determination result, the cluster control module 23 issues a command to the redundancy module 22 of fully copying the configuration information 21 of the active mode "control software G" in the redundancy group 26 to the "storage node E" (S31). Moreover, the redundancy module 22 that received the foregoing command transfers the configuration information 21 of the "control software G" to the "storage node E" via the backend network 5 (S32). Consequently, the cluster control module 23 of the "storage node E" that received the foregoing configuration information 21 stores the received configuration information 21 in the memory 11.

Moreover, when the redundancy module 22 of the "storage node D" completes copying the configuration information 21 of the "control software G" to the "storage node E", the redundancy module 22 starts to transfer the difference data, which shows the difference in comparison to the original configuration information 21 before and after the update, to the "storage node E" each time that the configuration information 21 retained in the "control software G" is updated. Consequently, the copy result of the configuration information 21 (that is, the configuration information 21) of the "control software G" in the "storage node E" is updated based on the difference data, and the synchronization of the configuration information 21 of the "control software G"

and the copy result of the configuration information 21 of the "control software G" in the "storage node E" is thereby started.

Figure 11:
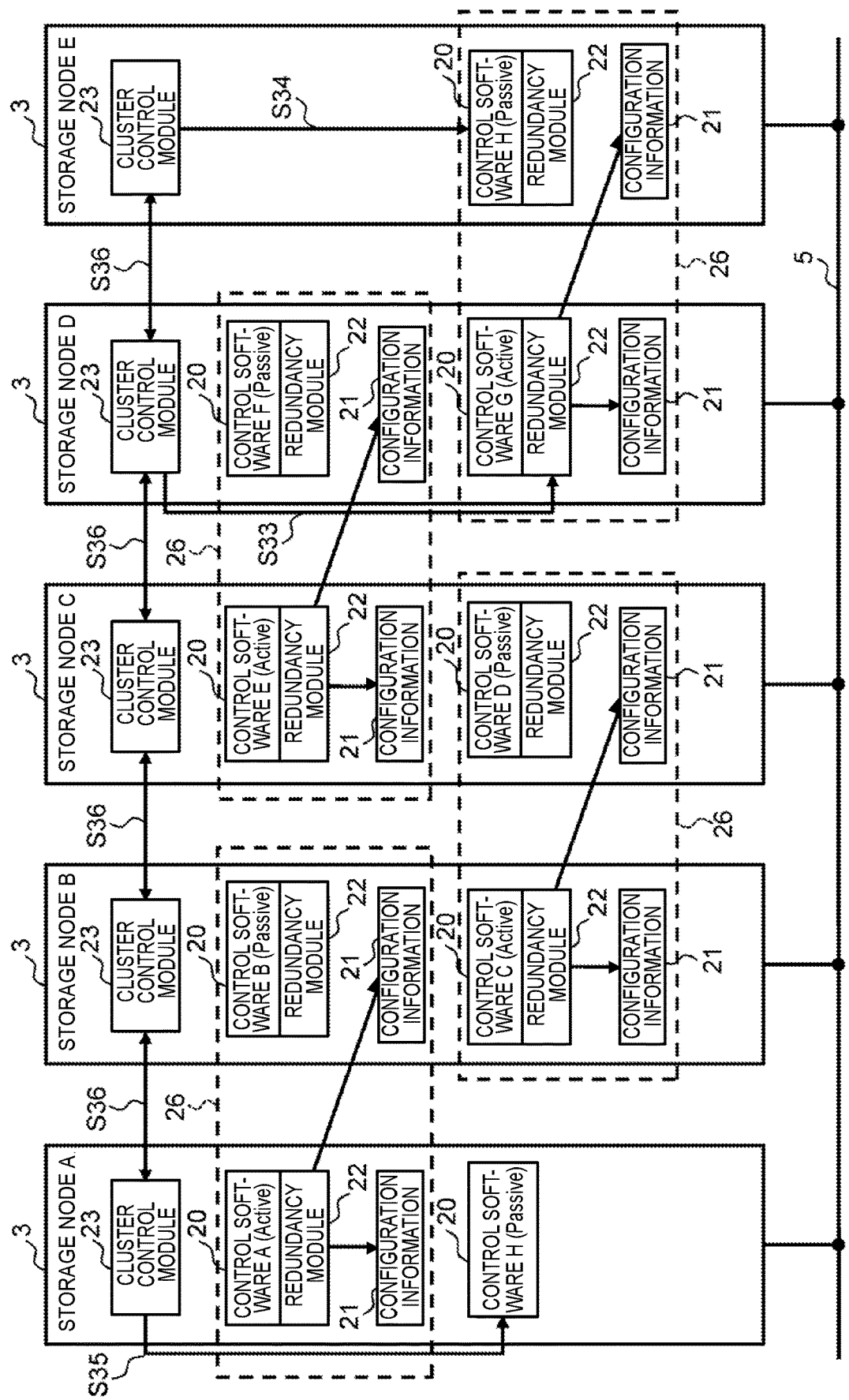
FIG. 11 is a block diagram explaining the redundancy function according to this embodiment.

Subsequently, the cluster control module 23 of the "storage node D" issues a command to the redundancy module 22 so that the redundancy destination of the "control software G" will only be the "storage node E" as shown in FIG. 11 (S33). Moreover, the cluster control module 23 of the "storage node D" notifies the cluster control module 23 of the "storage node E" to the effect that the full copy of the configuration information 21 retained in the "control software G" to the "storage node E" is complete.

Consequently, the cluster control module 23 of the "storage node E" that received the foregoing notice activates the control software 20 installed in the "storage node E" in the passive mode as the new "control software H" (S34). Moreover, the cluster control module 23 of the "storage node E" notifies the cluster control module 23 of the "storage node A", on which the original "control software H" is running, to such effect.

Subsequently, the cluster control module 23 of the "storage node A" that received the foregoing notice stops the operation of the "control software H" that is running on its own storage node 3 (S35). The redeployment of the "control software H" in the "storage node E" is thereby completed.

Subsequently, the representative cluster control module 23 updates the control software management table 25, which it is managing, according to the configuration change of the system as described above. Specifically, the representative cluster control module 23 changes the node ID stored in the operating node ID column 25D (FIG. 6) of the line corresponding to the "control software H" in the control software management table 25 to the node ID of the "storage node E" as the new deployment destination of the "control software H".

Moreover, the representative cluster control module 23 notifies the contents of the thus updated control software management table 25, which is it managing, to the cluster control models 23 of the respective storage nodes 3 in the same cluster 6 (S36). Consequently, the respective cluster control modules 23 that received the foregoing notice update the control software management table 25, that they are managing, to be the same contents as the contents of the new control software management table 25 notified from the representative cluster control module 23.

Figure 12:
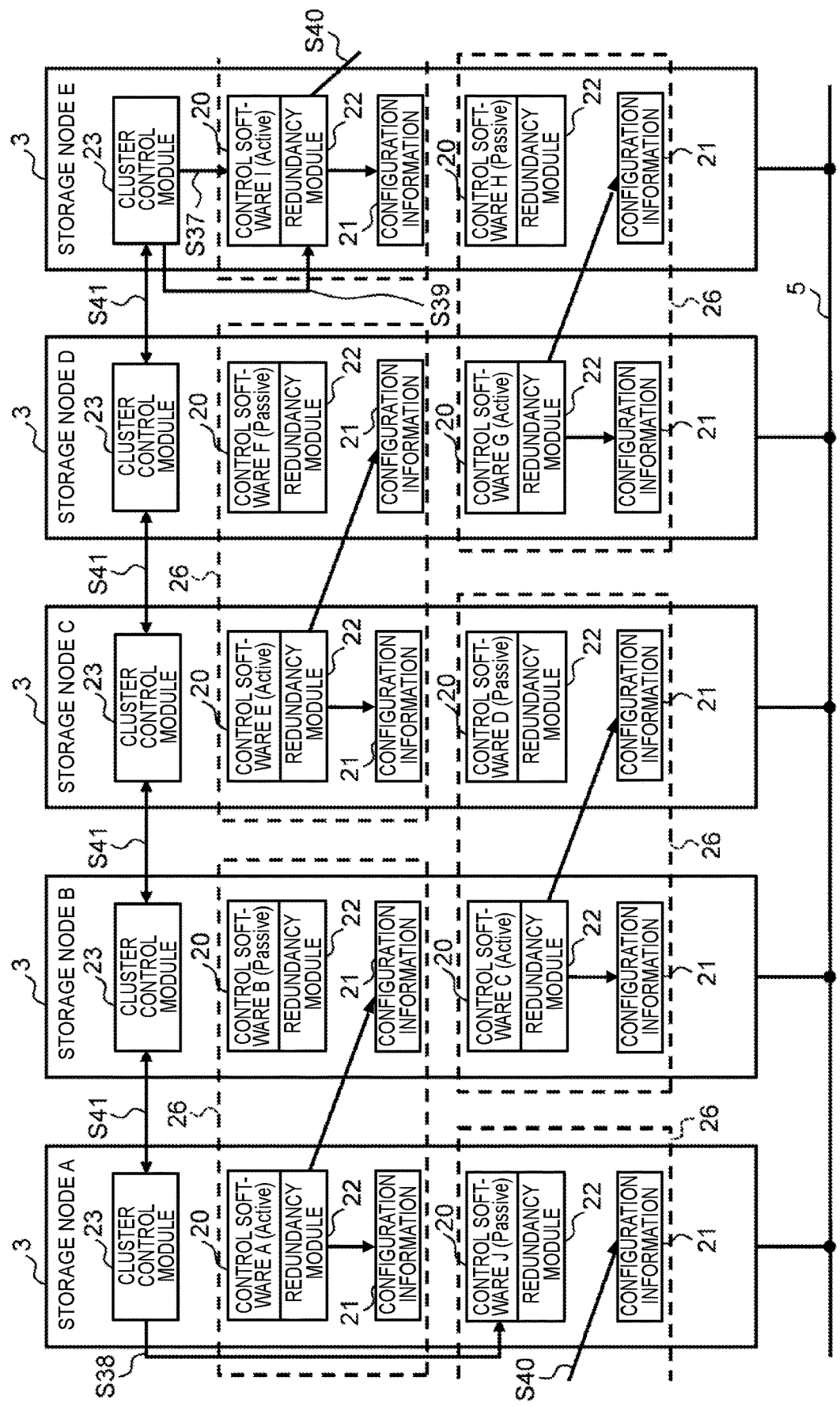
FIG. 12 is a block diagram explaining the redundancy function according to this embodiment.

Meanwhile, the representative cluster control module 23 subsequently refers to the storage node management table 24 and the control software management table 25, and, when the CPU load and unused memory amount of the "storage node E" and the communication band of the backend network 5 are sufficient, as shown in FIG. 12, issues a command to the cluster control module 23 of the "storage node E" so as to activate the new control software 20 as the "control software I" in the active mode. Consequently, the cluster control module 23 of the "storage node E" that received the foregoing activation command of the "control software I" activates unused control software 20 in the "storage node E" in the active mode as the "control software I" (S37).

Moreover, the representative cluster control module 23 determines the storage node 3 of the deployment destination of the control software 20 (this is hereinafter referred to as the "control software J") which configures the same redundancy group 26 as the "control software I". Here, the representative cluster control module 23 refers to the storage management table 24 and the control software management table 25, and determines the storage nodes 3 having a low load as the deployment destination of the "control software J". Here, let it be assumed that the "storage node A" was decided as the deployment destination of the "control software J".

Subsequently, the representative cluster control module 23 issues a command to the cluster control module 23 of the thus determined storage node 3 ("storage node A") to activate the new control software 20 as the "control software J" in the passive mode. Consequently, the cluster control module 23 of the "storage node A" that received the foregoing command activates the new control software 20 in the "storage node A" in the passive mode as the "control software J" (S38).

Subsequently, the representative cluster control module 23 notifies the node ID of the storage node 3 loaded with the "control software J" to the cluster control module 23 of the "storage node E". Moreover, the cluster control module 23 of the "storage node E" that received the foregoing notice notifies the redundancy module 22 in its own storage node 3 of the control software ID of the control software 20 ("control software J"), which configures the redundancy group 26 as the "control software I", and the node ID of the storage node 3 ("storage node A") loaded with the control software 20 (S39). Note that, in the ensuing explanation, the notice given to the redundancy module 22 in its own storage node 3 from the cluster control module 23 of the "storage node E" is referred to as an "ID notice".

Moreover, the representative cluster control module 23 updates the control software management table 25, which it is managing, according to the configuration of the new redundancy group 26 as described above. Specifically, the representative cluster control module 23 newly registers the "control software I" and the "control software J" in the control software management table 25.

Moreover, the representative cluster control module 23 stores "Active" in the control software management table 25 of the line corresponding to the "control software I" in the control software management table 25, stores the group ID assigned to the redundancy group 26, which is configured by the "control software I", in the group ID column 25C (FIG. 6) of that line, and additionally stores the node ID of the "storage node E", which is the deployment destination of the "control software I", in the operating node ID column 25D of that line.

Furthermore, the representative cluster control module 23 stores "Passive" in the status column 25B (FIG. 6) of the line corresponding to the "control software J" in the control software management table 25, stores the group ID assigned to the redundancy group 26, which is configured by the "control software J", in the group ID column 25C (FIG. 6) of that line, and additionally stores the node ID of the "storage node A", which is the deployment destination of the "control software J", in the operating node ID column 25D of that line.

Meanwhile, the redundancy module 22 that received the foregoing ID notice subsequently causes the "control software I" to start receiving read requests or write requests, and, by sending, as difference data, the difference in comparison to the original configuration information 21 to the "storage node A" loaded with the "control software J" each time the configuration information 21 of the "control software I" is changed, the configuration information 21 of the "control software J" is changed by being constantly synchronized with the configuration information 21 of the "control software I" (S40).

Moreover, the representative cluster control module 23 notifies the contents of the thus updated control software management table 25, that it is managing, to the cluster control modules 23 of the respective storage nodes 3 in the same cluster 6 (S41). Consequently, the respective cluster control modules 23 that received the foregoing notice update the control software management table 25, that they are managing, to be the same contents as the contents of the new control software management table 25 notified from the representative cluster control module 23.

Note that, in addition to the operation of immediately operating the control software 20 on the added storage node 3 after the storage node 3 is added as described above, it is also possible to apply an operation of leaving the storage node 3 unused without operating the control software 20 on the storage node 3 immediately after adding the storage node 3 in preparation for the sudden increase in the load of the other storage nodes 3 in the cluster 6.

(2-2-4) Active-Active Configuration

Figure 13:
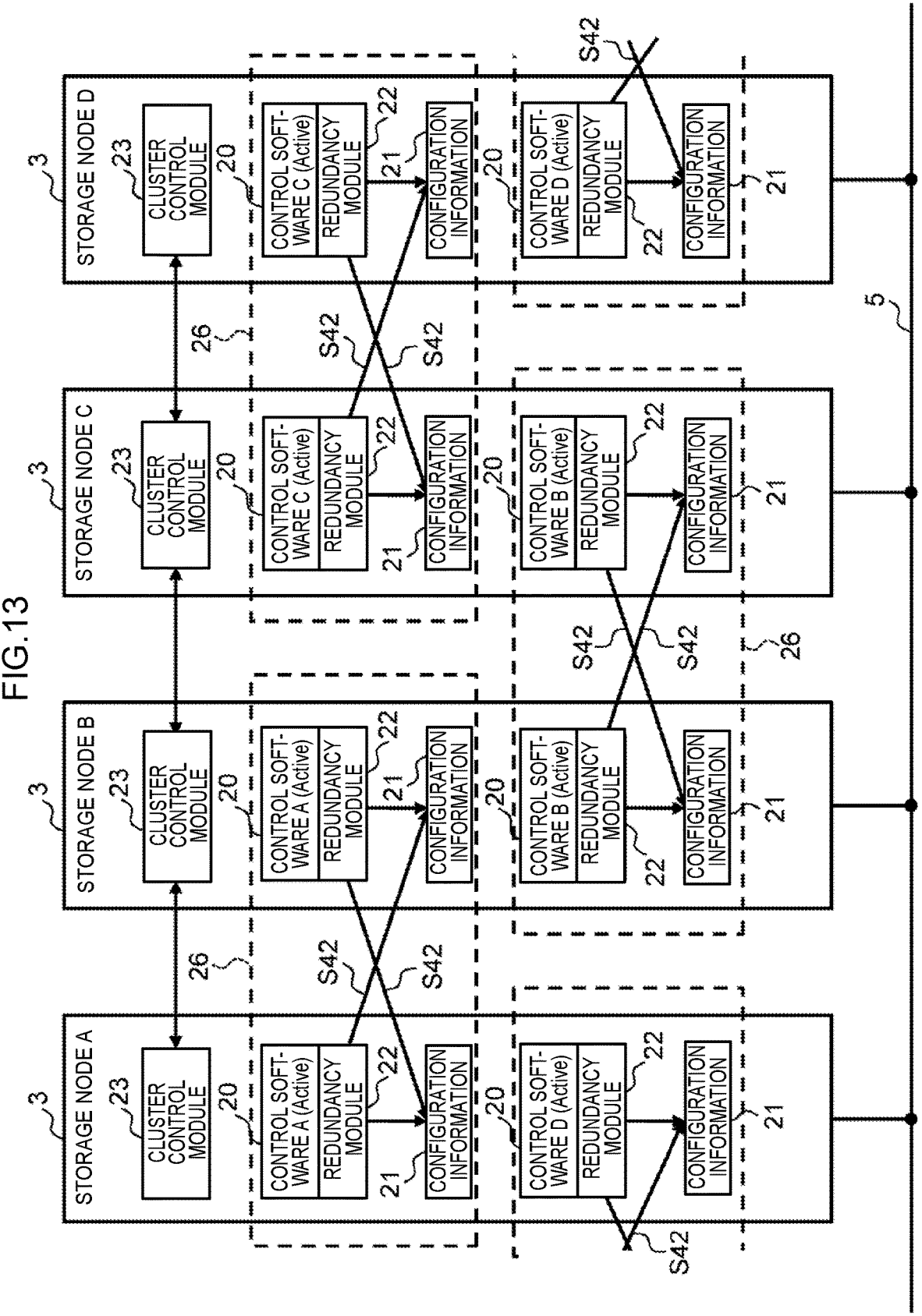
FIG. 13 is a block diagram explaining the redundancy function according to this embodiment.

FIG. 13 shows a logical configuration example of the cluster 6 in each redundancy group 26 when the two control software 20 configuring that redundancy group 26 are both set to the active mode.

In the foregoing case, in the respective redundancy groups 26, even when any one of the control software 20 updates the configuration information 21, a difference in the configuration information 21 before and after such update is transferred as difference data to the storage node 3 on which other control software 20 is running, and the configuration information 21 retained in the other control software update is updated based on the difference data (S42). Consequently, the two configuration information 21 respectively retained in the two control software 20 configuring the same redundancy group 26 are thereby constantly maintained (synchronously updated) to have the same contents.

Because the flow of processing when a storage node 3 is subject to a failure or when a storage node 3 is added in cases where the redundancy group 26 is set to have an active-active configuration is the same as the case of the active-passive configuration described above with reference to FIG. 7 to FIG. 12, the explanation thereof is omitted.

(2-3) Specific Processing Contents of Respective Programs During Addition/Removal of Storage Nodes The specific processing contents of the representative cluster control module 23 and the redundancy module 22 upon adding or removing the storage node 3 are now explained. Note that, in the ensuing explanation, while a "program" such as the cluster control module 23 or the redundancy module 22 is explained as the processing subject of the various types of processing, it goes without saying that, in effect, the CPU 10 (FIG. 2) of the storage node 3 executes the processing based on the "program".

(2-3-1) Redundancy Recovery Processing

Figure 14:
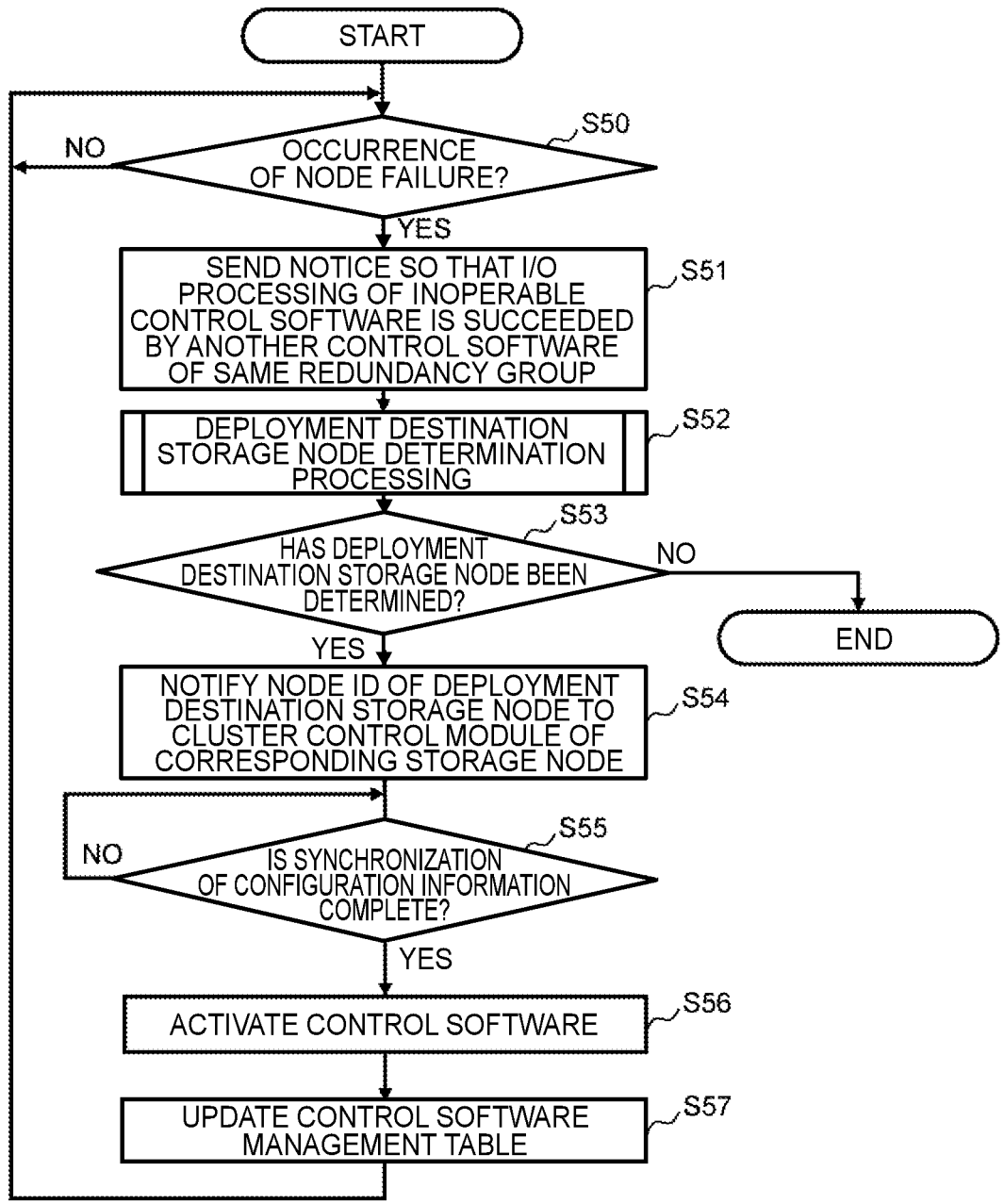
FIG. 14 is a flowchart showing the processing routine of the redundancy recovery processing.

FIG. 14 shows the processing routine of the redundancy recovery processing to be executed by the representative cluster control module 23 in the cluster 6 when a failure occurs in any one of the storage nodes 3 in that cluster 6.

During a normal period, the representative cluster control module 23 periodically communicates with the cluster control modules 23 loaded in the respective nodes 3 in the cluster 6 to which the representative cluster control module 23 belongs, and collects, from the respective cluster control modules 23, information to be stored in the storage node management table 24 described above with reference to FIG. 5, and the control software management table 25 described above with reference to FIG. 6.

Moreover, the representative cluster control module 23 executes the redundancy recovery processing shown in FIG. 14 in parallel with the foregoing processing and, based on whether or not it was possible to periodically communicate with the cluster control modules 23 of the respective storage nodes 3, monitors whether or not a failure has occurred in any one of the storage nodes 3, or monitors whether or not a predetermined command to the effect of removing any one of the storage node 3 has been issued (S50).

When the representative cluster control module 23 obtains a positive result in step S50 as a result of detecting that failure occurred in one of the storage nodes 3, for each control software (this is hereinafter referred to as the "inoperable control software") 20 deployed in the storage node 3 that was subject to a failure, the representative cluster control module 23 issues a command, so as to cause the I/O processing of the inoperable control software 20 to be succeeded by another control software (this is hereinafter referred to as the "intragroup control software") 20 which is configuring the same redundancy group 26 as the inoperable control software 20, to the cluster control module 23 of the storage node 3 loaded with the intragroup control software 20 (S51).

Here, when there are a plurality of intragroup control software 20, the representative cluster control module 23 determines, as the control software 20 to succeed the I/O processing of the inoperable control software 20, the intragroup control software 20 among the foregoing plurality of intragroup control software 20 deployed in a storage node 3 in which the capacity, CPU load, memory amount, and communication band of the backend network 5 of the storage device will not exceed the tolerance level even when the inoperable control software 20 succeeds the capacity, CPU load, memory amount, and communication band of the backend network 5 of the storage device that was being used before the failure occurred, and issues a command to the cluster control module 23 of the storage node 3 loaded with the intragroup control software 20.

Consequently, the cluster control module 23 that received the foregoing command refers to the control software management table 25, and, when the intragroup control software 20 has been set to the passive mode, changes the status of that intragroup control software 20 to an active mode.

Subsequently, the representative cluster control module 23 executes the deployment destination storage node determination processing for determining the storage node (this is hereinafter referred to as the "deployment destination storage node") 3 to become the deployment destination of the new control software 20 in substitute for the inoperable control software 20 (S52). For example, when the redundancy group 26 configured by the inoperable control software 20 and the intragroup control software 20 is an active-active configuration, the representative cluster control module 23 refers to the storage node management table 24 (FIG. 5), and determines a storage node 3 having a low load as the deployment destination storage node 3.

Next, the representative cluster control module 23 determines whether or not it was possible to determine the deployment destination storage node 3 based on the deployment destination storage node determination processing of step S52 (S53). When the representative cluster control module 23 obtains a negative result in the foregoing determination, the representative cluster control module 23 ends the redundancy recovery processing.

Meanwhile, when the representative cluster control module 23 obtains a positive result in the determination of step S53, the representative cluster control module 23 notifies the node ID of the thus determined deployment destination storage node 3 to the cluster control module 23 of the storage node 3 loaded with the foregoing intragroup control software 20 (S54).

Consequently, the cluster control module 23 that received the foregoing notice issues a command to the redundancy module 22 of its own storage node 3 so as to transfer the configuration information 21 retained in the intragroup control software 20 to the deployment destination storage node 3. Moreover, the redundancy module 22 that received the foregoing command fully copies the configuration information 21 to the deployment destination storage node 3 by transferring the configuration information 21 retained in the intragroup control software 20 to the deployment destination storage node 3 via the backend network 5.

When the configuration information 21 retained in the intragroup control software 20 is subsequently updated, the redundancy module 22 transfers the difference data, which is a difference in the configuration information 21 before and after such update, to the deployment destination storage node 3 via the backend network 5. Consequently, on the side of the deployment destination storage node 3, the copy of the configuration information 21 is updated based on the difference data, and the configuration information 21 retained in the intragroup control software 20 and the copy of the configuration information 21 in the deployment destination storage node 3 will be completely synchronously updated.

Meanwhile, after the processing of step S54, the representative cluster control module 12 waits for the synchronization of the configuration information 21 retained in the intragroup control software 20 and the copy of the configuration information 21 in the deployment destination storage node 3 to be completed (S55). When the synchronization of the two configuration information 21 is eventually completed, the representative cluster control module 23 issues a command to the cluster control module 23 of the deployment destination storage node 3 so as to activate the control software 20 to become the substitute of the inoperable control software 20 (S56).

Consequently, the cluster control module 23 of the deployment destination storage node 3 that received the foregoing command activates unused control software 20. Here, the cluster control module 23 activates the control software 20 in the passive mode upon adopting an active-passive configuration for the redundancy group 26 configured by the control software 20 and the intragroup control software 20, and activates the control software 20 in the active mode upon adopting an active-active configuration for that redundancy group 26. Moreover, the cluster control module 23 subsequently associates the control software 20 with the configuration information which was fully copied to the deployment destination storage node 3 in step S54. Consequently, the control software 20 subsequently retains the configuration information 21, and executes I/O processing based on the configuration information 21.

Subsequently, the representative cluster control module 23 updates the control software management table 25 (FIG. 6) retained in the own storage node 3 to the status after the inoperable control software 20 has been replaced with the control software 20 activated in step S56 (S57).

Specifically, the representative cluster control module 23 stores "Dead", which means that the inoperable control software 20 can no longer be used, in the status column 25B (FIG. 6) of the line corresponding to the inoperable control software 20 in the control software management table 25 in its own storage node 3.

Moreover, the representative cluster control module 23 secures one unused line of the control software management table 25, stores the control software ID unique to that control software 20 which was assigned to the control software 20 activated in step S56 in the control software ID column 25A (FIG. 6) of that line, stores the status of that control software 20 ("Active" or "Passive") in the status column 25B (FIG. 6) of that line, stores the group ID of the redundancy group 26 as the same as the inoperable control software 20 in the group ID column 25C (FIG. 6) of that line, and stores the node ID of the deployment destination storage node 3 in the operating node ID column 25D (FIG. 6) of that line.

Furthermore, the representative cluster control module 23 issues a command to the cluster control module 23 of another storage node 3 in the same cluster 6 so as to update the control software management table 25 in the same manner as described above.

When the representative cluster control module 23 completes updating the control software management table 25 of the respective storage nodes 3 in the cluster 6 as described above, the representative cluster control module 23 returns to step S50, and subsequently repeats step S50 onward in the same manner.

The processing contents of the representative cluster control module 23 in a case where the foregoing all control software migration command, which designates the storage nodes 3 to be removed, is issued are the same as above. In the foregoing case, processing is executed upon exchanging the foregoing "inoperable control software 20" with "the control software 20 running on the storage node 3 to be removed".

(2-3-2) Deployment Destination Storage Node Determination Processing

Figure 15:
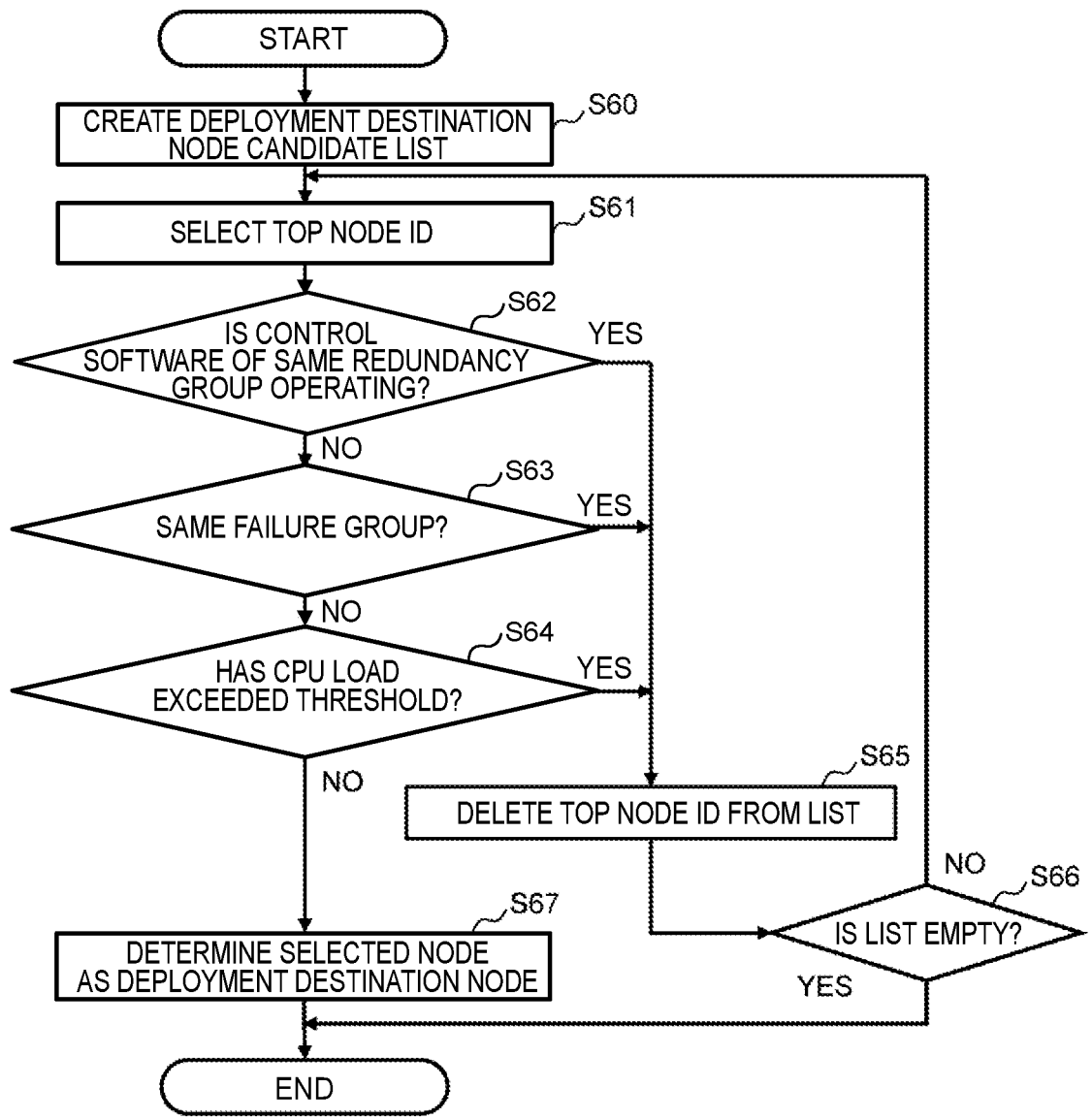
FIG. 15 is a flowchart showing the processing routine of the deployment destination storage node determination processing.

FIG. 15 shows the specific processing routine of the deployment destination storage node determination processing to be executed by the representative cluster control module 23 in step S52 of the redundancy recovery processing (FIG. 14).

When the representative cluster control module 23 proceeds to step S52 of the redundancy recovery processing, the representative cluster control module 23 starts the deployment destination storage node determination processing shown in FIG. 15, and foremost refers to the storage node management table 24 (FIG. 5), and then creates a list (this is hereinafter referred to as the "deployment destination node candidate list") which arranges the node ID of each storage node 3 in the cluster 6 in order from the storage node 3 having a low CPU load (S60). Here, when there are a plurality of storage nodes 3 that have the same CPU load, the representative cluster control module 23 sets the storage nodes 3 with fewer control software 20 in operation near the top of the list among the foregoing storage nodes 3.

Subsequently, the representative cluster control module 23 selects the top node ID among the respective storage nodes 3 in which their node ID is included in the deployment destination node candidate list created in step S60 (S61), and determines, by referring to the control software management table 25 (FIG. 6), whether or not control software 20 (that is, intragroup control software 20) belonging to the same redundancy group 26 as the inoperable control software 20 is running on the storage node (this is hereinafter referred to as the "first selected storage node") 3 corresponding to the selected node ID (S62). The representative cluster control module 23 proceeds to step S65 upon obtaining a positive result in the foregoing determination.

Meanwhile, when the representative cluster control module 23 obtains a negative result in the determination of step S62, the representative cluster control module 23 refers to the storage node management table 24, and determines whether or not the first selected storage node 3 belongs to the same failure group as the storage node loaded with another control software belonging to the same redundancy group 26 as the inoperable control software 20 (S63). The representative cluster control module 23 proceeds to step S65 upon obtaining a positive result in the foregoing determination.

Meanwhile, when the representative cluster control module 23 obtains a negative result in the determination of step S63, the representative cluster control module 23 refers to the storage node management table 24, and determines whether or not the capacity, CPU load, memory amount and communication band of the backend network 5 of the storage device of the first selected storage node 3 will exceed the tolerance level when the control software 20 to become the substitute of the inoperable control software 20 is deployed in the first selected storage node 3 (S64). The used capacity, CPU load, memory used amount and used communication band to be used by the substitute control software 20 can be determined, for instance, by storing, from the control software management table 25, the CPU load, memory used amount and used communication band, which were being used by the inoperable control software 20 immediately after the occurrence of the failure.

When the representative cluster control module 23 obtains a negative result in the determination of step S64, the representative cluster control module 23 determines the storage node (first selected storage node) 3, which was assigned the node ID selected in immediately preceding step S61, as the foregoing deployment destination storage node 3 (S67), subsequently ends the deployment destination storage node determination processing, and returns to the redundancy recovery processing (FIG. 14).

Meanwhile, when the representative cluster control module 23 obtains a positive result in the determination of step S64, the representative cluster control module 23 deletes the node ID selected in immediately preceding step S61 from the deployment destination node candidate list (S65), and thereafter determines whether or not the deployment destination node candidate destination list is now empty (S66).

When the representative cluster control module 23 obtains a negative result in the foregoing determination, the representative cluster control module 23 returns to step S61, and subsequently executes the processing of step S61 onward in the same manner. Moreover, when the representative cluster control module 23 obtains a positive result in the determination of step S66, the representative cluster control module 23 ends the deployment destination storage node determination processing.

(2-3-3) Rebalance Processing

Figure 16:
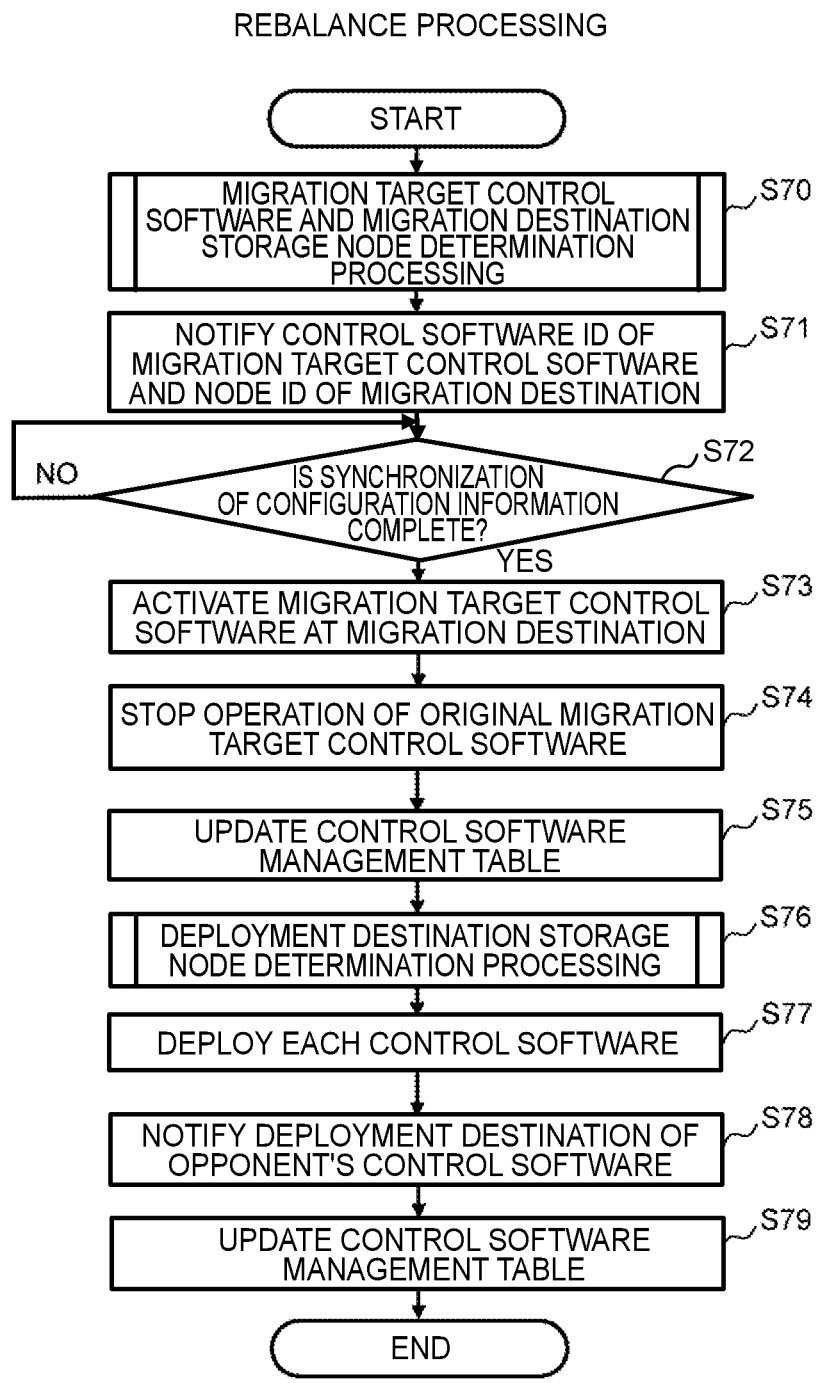
FIG. 16 is a flowchart showing the processing routine of the rebalance processing.

Meanwhile, FIG. 16 shows the processing routine of the rebalance processing to be periodically or randomly executed by the representative cluster control module 23 in the cluster when a storage node 3 has been added to the cluster 6, and even when a storage node 3 has not been added to the cluster 6. The representative cluster control module 23, in accordance with this processing routine, distributes the load of the respective storage nodes 3 in the cluster 6 by migrating the function of any one of the control software 20 in the cluster 6 to another storage node 3 (when a storage node 3 has been added to the cluster 6, then the added storage node (this is hereinafter referred to as the "added storage node") 3) in that cluster 6.

In effect, when the representative cluster control module 23 recognizes that a new storage node 3 has been added or that the periodical or random execution timing of the rebalance processing has arrived, the representative cluster control module 23 starts the rebalance processing shown in FIG. 16, and foremost executes the migration target control software and migration destination storage node determination processing of determining the control software (this is hereinafter referred to as the "migration target control software") 20 to be migrated to another storage node 3 (including the added storage node 3) in the cluster 6 and the storage node (this is hereinafter referred to as the "migration destination storage node") 3 to become the migration destination of the migration target control software 20, respectively (S70).

For example, when each redundancy group 26 is adopting an active-passive configuration, the representative cluster control module 23 determines one control software 20 set to the passive mode among the control software 20 loaded in a storage node having a high load as the migration target control software 20. Moreover, when a storage node 3 is added to the cluster 6, the representative cluster control module 23 determines the added storage node 3 as the migration destination storage node 3.

Subsequently, the representative cluster control module 23 notifies the control software ID of the migration target control software 20 and the node ID of the storage node (migration destination storage node) 3 to become the migration destination of the migration target control software 20 to the cluster control module 23 of the storage node 3 in which the migration target control software 20 determined in step S70 is running (S71).

Consequently, the cluster control module 23 that received the foregoing notice issues a command to the redundancy module 22 in its own storage node 3 so as to transfer the configuration information 21 retained in the migration target control software 20 to the notified migration destination storage node 3. Moreover, the redundancy module 22 that received the foregoing command transfers the configuration information 21 retained in the migration target control software 20 to the migration destination storage node 3 via the backend network 5. When the cluster control module 23 of the storage node 3 receives the configuration information 21, the cluster control module 23 stores the received configuration information 21 in the memory 11. Moreover, the redundancy module 22 subsequently transfers difference data to the migration destination storage node 3 via the backend network 5 so as to synchronize the configuration information 21 retained in the migration target control software 20, and the copy of the configuration information 21 retained in the migration destination storage node 3.

Meanwhile, after the processing of step S71, the representative cluster control module 23 waits for the synchronization of the configuration information 21 retained in the migration target control software 20 and the configuration information 21 copied to the migration destination storage node 3 (S72). When the synchronization of the two configuration information 21 is eventually completed, the representative cluster control module 23 issues a command to the cluster control module 23 of the migration destination storage node 3 so as to activate the control software 20 to become the substitute of the migration target control software 20 (S73).

Consequently, the cluster control module 23 of the migration destination storage node 3 that received the foregoing command activates the control software 20 to become the substitute of the migration target control software 20. Here, the cluster control module 23 activates the control software 20 in the passive mode when the migration target control software 20 was operating in the passive mode, and activates the control software 20 in the active mode when the migration target control software 20 was operating in the active mode.

Subsequently, the representative cluster control module 23 issues a command to the cluster control module 23 of the storage node 3, in which the migration target control software 20 is running, so as to stop the operation of the migration target control software 20 (S74). Consequently, the cluster control module 23 that received the foregoing command stops the operation of the migration target control software 20.

Subsequently, the representative cluster control module 23 updates the control software management table 25 (FIG. 6) retained in its own storage node 3 to a status after exchanging the migration target control software 20 and the control software 20 activated in step S73 as described above, and issues a command to the other cluster control module 23 to update the control software management table 25 (S75).

Specifically, the representative cluster control module 23 updates the node ID stored in the operating node ID column 25D (FIG. 6) of the line corresponding to the migration target control software 20 in the control software management table 25 in its own storage node 3 to the node ID of the migration destination storage node 3. Moreover, the representative cluster control module 23 issues a command to the cluster control module 23 of the other storage nodes 3 in the same cluster 6 so as to update the control software management table 25 in the same manner.

Next, the representative cluster control module 23 generates a new redundancy group 26, and respectively determines the deployment destination storage nodes 3 of the respective control software 20 configuring that redundancy group 26 (S76). In the foregoing case, the representative cluster control module 23 determines the deployment destination of one control software 20 among the respective control software 20 configuring the redundancy group 26 to be the migration destination storage node 3, and determines the deployment destination of the other control software 20 based on the deployment destination storage node determination processing described above with reference to FIG. 15.

Furthermore, the representative cluster control module 23 deploys the respective control software 20 configuring the new redundancy group 26 in the storage node 3 determined in step S76 according to the determination result of step S76 (S77). Specifically, the representative cluster control module 23 issues a command to the migration destination storage node 3 and the cluster control module 23 of the respective storage nodes 3 determined in step S76 so as to activate new control software 20. Consequently, each cluster control module 23 that received the foregoing command activates unused control software 20 in its own storage node 3.

Here, the representative cluster control module 23 notifies the node ID of the storage node 3 loaded with the other control software 20 to the cluster control module 23 of the storage node 3 (migration destination storage node 3) loaded with the control software 20 to be set to the active mode of the two control software 20 activated in step S77 (S78).

Consequently, the cluster control module 23 that received the foregoing notice notifies the control software ID of the other control software 20 and the node ID of the storage node 3 loaded with the other control software 20 to the redundancy module 22 in its own storage node 3. Moreover, the cluster control module 23 that received the foregoing notice causes the control software 20 to start receiving read requests or write requests, and, by sending, as difference data, the difference in comparison to the original configuration information 21 to the storage node 3 loaded with the other control software 20 each time the configuration information 21 retained in that control software 20 is updated, the configuration information 21 retained in the other control software 20 is updated in the same manner.

Subsequently, the representative cluster control module 23 updates the control cluster management table 25 (FIG. 6) in its own storage node 3 based on the processing result of step S76 to step S78, and additionally updates the control cluster management table 25 in the other storage nodes 3 in the same manner (S79).

Specifically, the representative cluster control module 23 newly registers the respective control software 20 configuring the newly created redundancy group 26 in the control cluster management table 25 in its own storage node 3, and, stores "Active" in the status column 25B (FIG. 6) of the line corresponding to the control software 20 running on the migration destination storage node 3 among the foregoing control software 20, and stores "Passive" in the status column 25B of the line corresponding to the other control software 20 among the foregoing control software 20. Moreover, the representative cluster control module 23 stores the group ID, which was assigned to the newly created redundancy group, in the group ID column 25C (FIG. 6) of that line, and additionally stores the node ID of the storage nodes 3, on which the corresponding control software 20 is running on the operating node ID column (FIG. 6) of that line.

Furthermore, the representative cluster control module 23 notifies the contents of the thus updated control software management table 25, which it is managing, to the cluster control modules 23 of the respective storage nodes 3 in the same cluster 6. Consequently, each cluster control module 23 that received the foregoing notice updates the control software management table 25, which it is managing, to be the same contents as the contents of the new control software management table 25 notified from the representative cluster control module 23.

The representative cluster control module 23 thereafter ends the rebalance processing.

(2-3-4) Migration Target Control Software and Migration Destination Storage Node Determination Processing FIG. 17 shows the specific processing routine of the migration target control software and migration destination storage node determination processing to be executed by the representative cluster control module 23 in step S70 of the rebalance processing.

When the representative cluster control module 23 proceeds to step S70 of the rebalance processing, the representative cluster control module 23 starts the migration target control software and migration destination storage node determination processing shown in FIG. 17, and foremost refers to the storage node management table 24 (FIG. 5), and then creates a list (this is hereinafter referred to as the "migration source node candidate list") which arranges the node ID of each storage node 3 in the cluster 6 in order from the storage node 3 having a low CPU load (S80). Here, when there are a plurality of storage nodes 3 that have the same CPU load, the representative cluster control module 23 sets the storage nodes 3 with the fewer control software 20 in operation near the top of the list among the foregoing storage nodes 3.

Subsequently, the representative cluster control module 23 selects the top node ID among the respective storage nodes 3 in which their node ID is included in the migration source node candidate list created in step S80 (S81), and determines, by referring to the control software management table 25 (FIG. 6), whether or not one or more control software 20 are running on the storage node (this is hereinafter referred to as the "second selected storage node") 3 corresponding to the selected node ID (S82). The representative cluster control module 23 proceeds to step S86 upon obtaining a negative result in the foregoing determination.

Meanwhile, when the representative cluster control module 23 obtains a positive result in the determination of step S82, the representative cluster control module 23 selects one control software 20 among the control software 20 running on the storage node 3 of the node ID selected in step S81, and determines the selected control software 20 as the migration target control software 20 (S83). As the method of selecting the migration target control software 20, for instance, control software 20 set to the passive mode is selected in order to suppress influence on the I/O performance during migration. Otherwise, when there is no control software 20 set to the passive mode, control software 20 having a low CPU load is selected among the control software 20 set to the active mode.

Subsequently, the representative cluster control module 23 determines the deployment destination storage node (migration destination storage node) 3 of the migration target control software 20 by executing the deployment destination storage node determination processing described above with reference to FIG. 15 (S84).

Furthermore, the representative cluster control module 23 whether or not it was possible to determine the deployment destination storage node (migration destination storage node) 3 of the migration target control software 20 based on the deployment destination storage node determination processing of step S84 (S85). When the representative cluster control module 23 obtains a positive result in the foregoing determination, the representative cluster control module 23 ends the migration target control software determination processing and returns to the rebalance processing.

Meanwhile, when the representative cluster control module 23 obtains a negative result in the determination of step S85, the representative cluster control module 23 deletes the node ID selected in step S81 from the migration source node candidate list (S86), and thereafter determines whether or not the migration source node candidate list is now empty (S87).

When the representative cluster control module 23 obtains a negative result in the foregoing determination, the representative cluster control module 23 returns to step S81, and subsequently executes the processing of step S81 onward in the same manner. Moreover, when the representative cluster control module 23 obtains a positive result in the determination of step S87, the representative cluster control module 23 ends the migration target control software determination processing and returns to the rebalance processing.

(3) Effect of this Embodiment

As described above, with this embodiment, because the control software 20 configuring the same redundancy group 26 are deployed by being distributed to different storage nodes 3 so that the load of the respective storage nodes 3 configuring the cluster 6 is distributed, the control software 20 are distributed and deployed in the respective storage nodes 3.

Thus, according to the information processing system 1 of this embodiment, the processing load can be distributed in the respective nodes 3 in the cluster 6, and information processing resources such as the CPU 10, the memory 11, the storage device 12 and the first and second communication devices 13, 14 of the respective storage nodes 3 can be effectively utilized.

Moreover, with the information processing system 1, even when any one of the control software 20 of the redundancy group 26 becomes inoperable due to the removal of the storage node 3 or a failure in the storage node 3, because the substitute control software 20 or the configuration information 21 to be used by that control software 20 is immediately reproduced in the appropriate storage node 3, the redundant configuration of the control software 20 can be maintained constantly and reliably, and the availability and reliability as the overall system can be improved by that much.

Furthermore, with the information processing system 1, because any one of the control software 20 in the cluster is redeployed, upon adding a storage node 3, in that storage node 3, the load of the storage nodes can be distributed without having to trouble the administrator of the information processing system 1, and the management as the overall system can be facilitated by that much.

(4) Other Embodiments

Note that, while the foregoing embodiments explained a case of the representative cluster control module 23 executing the processing of FIG. 14 to FIG. 17, the present invention is not limited thereto, and it is also possible to connect a management device (management unit), which is configured from a computer device such as a server device, to the storage service network 4 and the backend network 5 separately from the storage nodes 3, and the management device may execute a part or all of the processing of FIG. 14 to FIG. 17 in substitute for the representative cluster control module 23.

Moreover, while the foregoing embodiments explained a case of executing the rebalance processing described above with reference to FIG. 16 when a storage node 3 was added to the cluster 6, the present invention is not limited thereto, and rebalance processing of redeploying necessary control software 20 in other storage nodes 3 so as to distribute the load of the respective storage nodes 3 may be performed as needed.

Moreover, while the foregoing embodiments explained a case of executing the rebalance processing (FIG. 16) of deploying the control software 20 so as to distribute the load of all storage nodes 3, the present invention is not limited thereto, and it is also possible to adopt a distribution method of not deploying the control software 20 in the active mode, or not deploying the control software 20 irrespective of whether it is in the active mode or the passive mode, in certain storage nodes 3 during a normal period. In other words, by preparing storage nodes 3 with sufficient capacity, CPU load, memory amount, and communication band of the backend network 5 of the storage device, it is possible to a distribution method capable of preventing the shortage of calculation resources when a failure occurs.

Moreover, a hypervisor may run on a server, one or more virtual machines may run on the hypervisor, and the various programs shown in FIG. 3 may run on the virtual machines. In other words, the various programs (control software 20, redundancy module 22, cluster control module 23) may run on the hardware of a physical computer, or run on a virtual machine. Similarly, the compute node 2 may be an application program (host program) that runs on a virtual machine, or a physical host computer (host computer). When the information processing system 1 has a plurality of servers, certain servers may be installed at different sites. Moreover, a part or all of the servers of the information processing system 1 may be stored in a cloud, and services may be provided to users via a network.

The present invention may be a configuration (hyper converged infrastructure) in which a virtual machine on which various programs (control software 20, redundancy module 22, cluster control module 23) are operating and a virtual machine on which the host program is operating are on the same server (node), or a configuration in which they are on different servers which are connected via a network.

INDUSTRIAL APPLICABILITY

The present invention can be broadly applied to information processing systems of various configurations comprising a plurality of storage nodes.

REFERENCE SIGNS LIST

1 . . . information processing system, 2 . . . compute node, 3 . . . storage node, 4 . . . storage service network, 5 . . . backend network, 6 . . . cluster, 10 . . . CPU, 11 . . . memory, 12 . . . storage device, 20 . . . control software, 21 . . . configuration information, 22 . . . redundancy module, 23 . . . cluster control module, 24 . . . storage node management table, 25 . . . control software management table.

The invention claimed is:

1. A storage system including a plurality of storage nodes and one or more storage devices which respectively provide a storage area, wherein the storage system comprising: one or more control software which read/write requested data from/into a corresponding storage device according to a request from a higher-level device; and a management unit that manages each of the control software in a cluster configured from the plurality of storage nodes, wherein each of the control software retains predetermined configuration information required for reading/writing requested data from/into the corresponding storage device according to a request from the higher-level device, wherein a plurality of the control software are managed as a redundancy group, and the predetermined configuration information retained in each of the control software belonging to a same redundancy group is synchronously updated, wherein control software management information that stores a status of each of the control software, a redundancy group to which each of the control software belongs, and volumes of which the redundancy group is in charge, is retained, wherein when the management unit receives a request from the higher-level device, the management unit identifies a storage node, in which the plurality of the control software for a redundancy group in charge of a volume related to the request is deployed, on a basis of the control software management information and transfers the request from the higher-level device to the identified storage node, and wherein when a storage node is added to the storage system, the management unit migrates control software which is running on an existing storage node to the added storage node, configures a new redundancy group which has a plurality of control software, and deploys the plurality of control software of the new redundancy group to a plurality of storage nodes including the added storage node.

2. The storage system according to claim 1, wherein each of the storage nodes has the control software management information, and wherein when the control software management information is updated for one node, the updated control software management information is reflected in the control software management information of other storage nodes.

3. The storage system according to claim 1, wherein at least one of the one or more control software among the plurality of control software configuring the same redundancy group is set to a first status of receiving a request from the higher-level device, and the remaining one or more control software belonging to a corresponding redundancy group are set to a second status of not receiving a request from the higher-level device, wherein the plurality of control software belonging to different redundancy groups are deployed in a same storage node, and wherein the management unit transfers the request from the higher-level device to a storage node where the at least one of the one or more control software in the first status of the redundancy group in charge of the volume related to the request is deployed.

4. The storage system according to claim 3, wherein, upon removing the storage node or when the storage node is subject to a failure, the management unit switches, to the first status, any one of the one or more control software in the second status belonging to the same redundancy group as the one or more control software in the first status deployed in a corresponding storage node.

5. The storage system according to claim 4, wherein the control software management information has a storage node resource usage amount of the one or more control software, and wherein, when there are a plurality of candidates of the one or more control software to succeed processing of the one or more control software set to the first status, the management unit causes, among the plurality of candidates of the one or more control software, the one or more control software deployed in the storage node with a low load, to succeed the processing on the basis of the control software management information.

6. The storage system according to claim 1, wherein, with respect to the redundancy group in which a number of control software has decreased due to a reduction or failure of the storage node, the management unit activates new control software to substitute the one or more control software which was deployed in the storage node that was reduced or subject to a failure in the storage node in which the one or more control software belonging to the corresponding redundancy group has not been deployed.

7. The storage system according to claim 6, wherein the control software management information has a storage node resource usage amount of the one or more control software, and wherein, when there are a plurality of storage nodes which may become a deployment destination of the one or more control software which is new to become a substitute for the one or more control software which was deployed in the storage node, the management unit causes the storage node with a low, to become the deployment destination of the new control software to become the substitute for the one or more control software, on the basis of the control software management information.

8. The storage system according to claim 1,
wherein, when the storage node is added in the cluster, the management unit redeploys certain control software, which were deployed in other storage nodes in the cluster, to the added storage node.

9. The storage system according to claim 1, wherein, when the storage node is added in the cluster, the management unit generates a new redundancy group, deploys one of the one or more control software, which belongs to the new redundancy group, to the added storage node, and deploys other control software, which belong to the new redundancy group, to other storage nodes.

10. The storage system according to claim 9, wherein the control software management information has a storage node resource usage amount of the one or more control software, and wherein, when there are a plurality of storage nodes which may become a deployment destination of the other control software belonging to the redundancy group which is new, the management unit causes the storage node with a low load, to become the deployment destination of the other control software belonging to the new redundancy group on the basis of the control software management information.

11. The storage system according to claim 1, wherein a node to deploy the one or more control software of the new redundancy group includes a storage node at which the one or more control software migrated to the added storage node was deployed before being migrated.

12. A control software deployment method of deploying, in a storage system including a plurality of storage nodes each equipped with one or more storage devices which respectively provide a storage area, one or more control software which read/write requested data from/into a corresponding storage device according to a request from a higher-level device, and a management unit that manages each of the one or more control software in a cluster configured from the plurality of storage nodes, wherein each of the one or more control software retains predetermined configuration information required for reading/writing requested data from/into the corresponding storage device according to a request from the higher-level device, and wherein the one or more control software deployment method comprises the steps of: managing a plurality of the one or more control software as a redundancy group, and synchronously updating the predetermined configuration information retained in each of the one or more control software belonging to a same redundancy group; retaining control software management information that stores a status of the one or more control software, a redundancy group to which the one or more control software belongs, and volumes of which the redundancy group is in charge; when the management unit receives a request from the higher-level device, identifying, by the management unit, a storage node, in which the one or more control software for a redundancy group in charge of a volume related to the request is deployed, on a basis of the control software management information and transferring, by the management unit, the request from the higher-level device to the identified storage node; and when a storage node is added to the storage system, migrating, by the management unit, the one or more control software which is running on an existing storage node to the added storage node, configuring, by the management unit, a new redundancy group which has a plurality of control software, and deploying, by the management unit, the plurality of control software of the new redundancy group a plurality of storage nodes including the added storage node.

* * * * *